United States Patent
Takenaka et al.

(10) Patent No.: US 6,762,235 B2
(45) Date of Patent: Jul. 13, 2004

(54) POLYBUTYLENE TEREPHTHALATE RESIN AND COMPOSITIONS AND MOLDED ARTICLES COMPRISING THE RESIN

(75) Inventors: Kunihiro Takenaka, Ebina (JP); Ryo Saito, Hiratsuka (JP); Hidekazu Shoji, Naka-gun (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 135 days.

(21) Appl. No.: 10/126,406

(22) Filed: Apr. 19, 2002

(65) Prior Publication Data
US 2003/0069339 A1 Apr. 10, 2003

(30) Foreign Application Priority Data

| Apr. 24, 2001 | (JP) | 2001-125708 |
| Apr. 24, 2001 | (JP) | 2001-125709 |
| Feb. 14, 2002 | (JP) | 2002-037026 |
| Mar. 5, 2002 | (JP) | 2002-059031 |

(51) Int. Cl.⁷ .............. C08K 3/40; C08L 67/02; C08G 63/16
(52) U.S. Cl. ............ 524/494; 524/605; 525/438; 528/308.6; 528/308.8
(58) Field of Search .............. 524/494, 605; 525/438; 528/308.6, 308.8

(56) References Cited

U.S. PATENT DOCUMENTS

| 4,010,219 A | * | 3/1977 | Aoyama et al. ........... 524/114 |
| 5,334,343 A | * | 8/1994 | Po'et al. ................... 264/328 |
| 6,242,519 B1 | * | 6/2001 | Cheret et al. ............. 524/396 |

FOREIGN PATENT DOCUMENTS

| EP | 0 639 601 A2 | 2/1995 |
| JP | 06-184410 A | 7/1994 |
| JP | 6-256628 A | 9/1994 |
| JP | 7-149880 A | 6/1995 |
| JP | 8-209004 A | 8/1996 |
| JP | 8-227030 A | 9/1996 |
| JP | 10-25404 A | 1/1998 |
| JP | 2000-111768 A | 4/2000 |

* cited by examiner

Primary Examiner—Kriellion A. Sanders
(74) Attorney, Agent, or Firm—Frishauf, Holtz, Goodman & Chick, P.C.

(57) ABSTRACT

A polybutylene terephthalate resin having 30 eq/t or less of carboxyl end group, a crystallization temperature in a temperature decrease of 175° C. or higher and an amount of residual tetrahydrofuran of 300 ppm by weight or less; and compositions and molded articles comprising the resin and glass fiber, antioxidants and mold-releasing agents is provided. The polybutylene terephthalate resin can be molded in a short molding cycle, exhibits excellent resistance to hydrolysis and mold-releasing property, causes no corrosion of metals and generates little gas during molding. The compositions and the molded articles exhibit improved impact resistance, stability under heating and oxidation and mold-releasing property and can be advantageously used for members in electric and electronic products and in automobiles.

34 Claims, 1 Drawing Sheet

Fig. 1

POLYBUTYLENE TEREPHTHALATE RESIN AND COMPOSITIONS AND MOLDED ARTICLES COMPRISING THE RESIN

BACKGROUND OF THE INVENTION

1. Field of the Invention

The present invention relates to a polybutylene terephthalate resin and compositions and molded articles comprising the resin. More particularly, the present invention relates to a polybutylene terephthalate resin which can be molded in a short molding cycle with excellent productivity, exhibits excellent stability to hydrolysis, causes no corrosion of electric contacts and can be advantageously used for members of electric and electronic products such as relays. The present invention further relates to polybutylene terephthalate resin compositions and molded articles which are obtained by adding reinforcing agents and additives to the above resin and exhibit improved impact resistance, stability under heating and oxidation and mold-releasing property.

2. Description of Related Art

Polybutylene terephthalate resins which are typical engineering plastic resins among thermoplastic polyester resins are widely used in the fields of members in automobiles, electric and electronic products and precision instruments since the polybutylene terephthalate resins can be easily molded and exhibit excellent physical and chemical properties such as mechanical properties, heat resistance and electric properties.

Although polybutylene terephthalate resins have the above advantageous properties, it is also known that these resins have some drawbacks. Since polybutylene terephthalate resins absorb little moisture, these resins are essentially not susceptible to the effect of water. However, the ester bond is hydrolyzed with water and water vapor at high temperatures and hydroxyl group and carboxyl group are formed. The formed carboxyl group works as the self-catalyst and further accelerates the hydrolysis. Therefore, in a hot and humid environment, the use of polybutylene terephthalate is restricted. Polybutylene terephthalate resins has carboxyl group derived from terephthalic acid used as the raw material at chain ends thereof. The carboxyl end group also affects the resistance to hydrolysis of polybutylene terephthalate resins.

When a polybutylene terephthalate resin is used for members of electric and electronic products such as relays, there is the possibility that corrosion of metal contacts and attachment of carbonated products at metal contacts take place due to organic gases generated from the resin and the contacts do not work properly. Organic gases generated from the resin also occasionally causes corrosion of molds due to the direct reaction with the molds at high temperatures during molding. It is considered that the organic gases generated from the resin comprise tetrahydrofuran residual in the polybutylene terephthalate resin as the main component although organic gases formed by heat decomposition of the polybutylene terephthalate resin and additives during or after the molding may also be present in minor amounts.

Polybutylene terephthalate resins are resins exhibiting an excellent molding property among engineering resins since the rate of crystallization is relatively great and the molding cycle is short. However, a further improvement in the molding property is desired. It is effective for improving the molding property that the crystallization temperature of the polybutylene terephthalate is elevated.

To reduce the amount of carboxyl end group, a lower reaction temperature and a shorter reaction time can be adopted in the production of the polybutylene terephthalate. However, the molecular weight of the obtained polybutylene terephthalate resin becomes smaller under these conditions. To overcome this drawback, a process in which a polybutylene terephthalate resin produced by the polymerization in the melted condition at a relatively low temperature for a relatively short time is further treated by the solid phase polymerization to increase the molecular weight, is known.

For example, in Japanese Patent Application Laid-Open No. Heisei 7(1995)-149880, an invention on a novel polybutylene terephthalate resin which has less than 30 meq/kg of COOH end group and a number-average molecular weight (Mn) of at least 30,000 and exhibits an excellent bonding property to lacquers is disclosed. In the examples of this invention, it is shown that PBT-4 having 7.5 meq/kg of COOH group at the chain ends and Mn of 41,200 could be obtained when dimethyl terephthalate and butanediol were treated by polycondensation, followed by post condensation in the solid phase.

In Japanese Patent Application Laid-Open No. Heisei 6(1994)-256628, it is proposed that a polybutylene terephthalate resin having 20 eq/$10^6$ g or less of carboxyl end group is used for improving resistance to hydrolysis of a polybutylene terephthalate resin composition comprising flame retardants. As the process for obtaining the polybutylene terephthalate resin having carboxyl end group in such a small amount, a process in which, in polycondensation of 1,4-butanediol and terephthalic acid or an ester thereof with a lower alcohol, the polycondensation is stopped in the melted condition when the intrinsic viscosity reaches 0.1 to 0.55 dl/g and, after solidifying the product by cooling, solid phase polycondensation is conducted to achieve an intrinsic viscosity of 0.6 to 2 dl/g, is disclosed.

In the specifications of the above applications, no descriptions on the content of tetrahydrofuran or the crystallization temperature can be found. Although the polybutylene terephthalate resins described above have decreased amounts of carboxyl end group, the content of tetrahydrofuran and the crystallization temperature are not known.

In Japanese Patent Application Laid-Open No. 2000-111768, an invention on a loose tube for optical fibers comprising a polybutylene terephthalate resin which contains 0.30% by weight or smaller of butylene terephthalate oligomer, generates 10 ppm or less of volatile gases by a heat treatment at 150° C. for 60 minutes and has a concentration of carboxyl end group of 30 eq/t or smaller and an inherent viscosity of 1.0 to 1.2 dl/g is described. In the above application, it is described that excellent resistance to hydrolysis is exhibited and formation of gum is suppressed in extrusion when the above resin is used. However, no descriptions can be found on the crystallization temperature of the polybutylene terephthalate resin. In the above application, the method for decreasing the concentration of oligomers of the polybutylene terephthalate resin is shown. However, the processes for decreasing the amounts of volatile gases and carboxyl end group to the desired values are not disclosed. No descriptions can be found on the process for preparing the polybutylene terephthalate resin used in the above application, either.

To prevent occurrence of poor contact due to organic gases generated from molded articles such as relays and switches using a polybutylene terephthalate resin, it has heretofore been known that the molded articles are degassed by baking in a vacuum. However, the baking in a vacuum has drawbacks in that productivity is small and that the treated molded articles lose gloss or become fragile due to loss of toughness.

In Japanese Patent Application Laid-Open No. Heisei 8(1996)-209004, a thermoplastic resin composition for members of electric and electronic products having contacts in which 0.2 to 10 parts by weight of a polyol such as 1,4-butanediol and polyethylene glycol is added to 100 parts by weight of a thermoplastic resin such as a polybutylene terephthalate resin is proposed as the material for solving the above problems on the degassing by baking in a vacuum. It is described in this application that, when the resin composition is heated, a gas generated from the aliphatic polyol works on electric contacts as a protective component on the contacts and suppresses an increase in resistance of contact and the occurrence of poor contact can be prevented. However, fouling of molds and decreases in mechanical properties of molded articles of the resin are inevitable when the polyol is added in such a great amount.

In Japanese Patent Application Laid-Open No. Heisei 8(1996)-227030, an invention on a covering tube for optical fibers obtained by extrusion of a polybutylene terephthalate resin or a composition thereof is described. It is described in this application that the polybutylene terephthalate resin preferably satisfies the following condition: $T_m - T_{ic} \leq 30$, wherein $T_m$ represents the melting point of the resin and $T_{ic}$ represents an extrapolated starting temperature of crystallization of the resin. To satisfy this condition, it is necessary that the crystallization temperature of the resin be elevated. However, a method of adding a nucleating agent of crystallization such as boron nitride is used as the means for elevating the crystallization temperature of the polybutylene terephthalate resin and no descriptions can be found on the elevation of the crystallization temperature of the resin itself. Moreover the concentrations of carboxyl end group in the polybutylene terephthalate resins described in the above application is 40 meq/kg or greater in all cases.

As described above, polybutylene terephthalate resins in which one or two factors among the amount of carboxyl end group, the amount of residual tetrahydrofuran and the crystallization temperature are controlled have been known. However, no polybutylene terephthalate resins in which all three factors are controlled have been known as far as the present inventors are aware of.

SUMMARY OF THE INVENTION

The present invention has an object of providing a polybutylene terephthalate resin which can be molded in a short molding cycle with excellent productivity, exhibits excellent stability to hydrolysis, causes no corrosion of electric contacts and can be advantageously used for members of electric and electronic products such as relays, polybutylene terephthalate resin compositions which are obtained by adding reinforcing agents and/or additives to the above resin and exhibit further improved impact resistance, stability under heating and oxidation and mold-releasing property and a molded article comprising the resin or the composition.

As the result of intensive studies to overcome the above drawbacks, it was found that a polybutylene terephthalate resin having 30 eq/t or less of carboxyl end group, a crystallization temperature in a temperature decrease of 175° C. or higher and an amount of residual tetrahydrofuran of 300 ppm by weight or less could be molded in a short molding cycle with excellent productivity, exhibited excellent stability to hydrolysis and caused no corrosion of metals and that polybutylene terephthalate resin compositions and molded articles exhibiting further improved impact resistance, stability under heating and oxidation and mold-releasing property could be obtained by adding glass fiber, antioxidants and mold-releasing agents to the above polybutylene terephthalate resin. The present invention has been completed based on this knowledge.

The present invention provides:

(1) A polybutylene terephthalate resin having 30 eq/t or less of carboxyl end group and a crystallization temperature in a temperature decrease of 175° C. or higher as measured by a differential scanning calorimeter at a rate of the temperature decrease of 20° C./min;

(2) A resin described in (1), which has an amount of residual tetrahydrofuran of 300 ppm by weight or less in the polybutylene terephthalate resin;

(3) A resin described in (1), which has an amount of residual tetrahydrofuran of 50 to 300 ppm by weight or less in the polybutylene terephthalate resin;

(4) A resin described in (1), which has an intrinsic viscosity of 0.5 to 1.5 dl/g as measured at 30° C. in a mixed solvent composed of phenol and 1,1,3,2-tetrachloroethane in relative amounts by weight of 1/1;

(5) A resin described in (1), which is obtained by continuous polycondensation using terephthalic acid and 1,4-butanediol as main raw materials;

(6) A polybutylene terephthalate resin which has a crystallization temperature in a temperature decrease of 175° C. or higher as measured by a differential scanning calorimeter at a rate of the temperature decrease of 20° C./min and an amount of residual tetrahydrofuran of 300 ppm by weight or less in the resin;

(7) A resin described in (6), which has an intrinsic viscosity of 0.5 to 1.5 dl/g as measured at 30° C. in a mixed solvent composed of phenol and 1,1,2,2-tetrachloroethane in relative amounts by weight of 1/1;

(8) A resin described in (6), which is prepared by continuous polycondensation using terephthalic acid and 1,4-butanediol as main raw materials;

(9) A polybutylene terephthalate resin composition which comprises a polybutylene terephthalate resin which has 30 eq/t or less of carboxyl end group and a crystallization temperature in a temperature decrease of 175° C. or higher as measured by a differential scanning calorimeter at a rate of the temperature decrease of 20° C./min, and glass fiber;

(10) A composition described in (9), wherein the polybutylene terephthalate resin has an amount of residual tetrahydrofuran of 300 ppm by weight or less in the polybutylene terephthalate resin;

(11) A composition described in (9), wherein the polybutylene terephthalate resin has an amount of residual tetrahydrofuran of 50 to 300 ppm.

(12) A composition described in (9), wherein the polybutylene terephthalate resin has an intrinsic viscosity of 0.5 to 1.5 dl/g as measured at 30° C. in a mixed solvent composed of phenol and 1,1,2,2-tetrachloroethane in relative amounts by weight of 1/1;

(13) A composition described in (9), wherein the polybutylene terephthalate resin is obtained by continuous polycondensation using terephthalic acid and 1,4-butanediol as main raw materials;

(14) A composition described in (9), which comprises glass fiber in an amount of 3 to 150 parts by weight per 100 parts by weight of the polybutylene terephthalate resin;

(15) A polybutylene terephthalate resin composition which comprises a polybutylene terephthalate resin which has a crystallization temperature in a temperature decrease of 175° C. or higher as measured by a differential scanning calorimeter at a rate of the temperature decrease of 20° C./min and an amount of residual tetrahydrofuran of 300 ppm by weight or less in the polybutylene terephthalate resin, and glass fiber;

(16) A composition described in (15), wherein the polybutylene terephthalate resin has an intrinsic viscosity of 0.5 to 1.5 dl/g as measured at 30° C. in a mixed solvent composed of phenol and 1,1,2,2-tetrachloroethane in relative amounts by weight of 1/1;

(17) A composition described in (15), wherein the polybutylene terephthalate resin is a resin produced by continuous polycondensation using terephthalic acid and 1,4-butanediol as main raw materials;

(18) A polybutylene terephthalate resin composition which comprises a polybutylene terephthalate resin which has 30 eq/t or less of carboxyl end group and a crystallization temperature in a temperature decrease of 175° C. or higher as measured by a differential scanning calorimeter at a rate of the temperature decrease of 20° C./min, and phenolic antioxidants;

(19) A composition described in (18), which further comprises at least one antioxidant selected from a group consisting of sulfur-based antioxidants and phosphorus-based antioxidants;

(20) A composition described in (18), wherein the phenolic antioxidants are hindered phenolic antioxidants;

(21) A composition described in (19), wherein the sulfur-based antioxidants are thioether-based antioxidants;

(22) A composition described in 18, which has an amount of residual tetrahydrofuran of 300 ppm by weight or less in the polybutylene terephthalate resin;

(23) A composition described in (18), wherein the polybutylene terephthalate resin has an amount of residual tetrahydrofuran of 50 to 300 ppm.

(24) A composition described in (18), wherein the polybutylene terephthalate resin has an inherent intrinsic viscosity of 0.5 to 1.5 dl/g as measured at 30° C. in a mixed solvent composed of phenol and 1,1,2,2-tetrachloroethane in relative amounts by weight of 1/1;

(25) A composition described in (18), wherein the polybutylene terephthalate resin is a resin produced by continuous polycondensation using terephthalic acid and 1,4-butanediol as main raw materials;

(26) A composition described in (18), which comprises the phenolic antioxidants in an amount of 0.001 to 2 parts by weight per 100 parts by weight of the polybutylene terephthalate resin;

(27) A polybutylene terephthalate resin composition which comprises a polybutylene terephthalate resin which has a crystallization temperature in a temperature decrease of 175° C. or higher as measured by a differential scanning calorimeter at a rate of the temperature decrease of 20° C./min and an amount of residual tetrahydrofuran of 300 ppm by weight or less in the polybutylene terephthalate resin, and phenolic antioxidants;

(28) A composition described in (27), which further comprises at least one antioxidant selected from a group consisting of sulfur-based antioxidants and phosphorus-based antioxidants;

(29) A composition described in (27), wherein the phenolic antioxidants are hindered phenolic antioxidants;

(30) A composition described in (28), wherein the sulfur-based antioxidants are thioether-based antioxidants;

(31) A composition described in (27), wherein the polybutylene terephthalate resin has an intrinsic viscosity of 0.5 to 1.5 dl/g as measured at 30° C. in a mixed solvent composed of phenol and 1,1,2,2-tetrachloroethane in relative amounts by weight of 1/1;

(32) A composition described in (27), wherein the polybutylene terephthalate resin is a resin produced by continuous polycondensation using terephthalic acid and 1,4-butanediol as main raw materials;

(33) A polybutylene terephthalate resin composition which comprises a polybutylene terephthalate resin which has 30 eq/t or less of carboxyl end group and a crystallization temperature in a temperature decrease of 175° C. or higher as measured by a differential scanning calorimeter at a rate of the temperature decrease of 20° C./min, and a fatty acid ester which has a residue group of a fatty acid having 12 to 36 carbon atoms and a residue group of an alcohol having 1 to 36 carbon atoms;

(34) A composition described in (33), which has an amount of residual tetrahydrofuran of 300 ppm by weight or less in the polybutylene terephthalate resin;

(35) A composition described in (33), wherein the polybutylene terephthalate resin has an amount of residual tetrahydrofuran of 50 to 300 ppm.

(36) A composition described in (33), wherein the polybutylene terephthalate resin has an intrinsic viscosity of 0.5 to 1.5 dl/g as measured at 30° C. in a mixed solvent composed of phenol and 1,1,2,2-tetrachloroethane in relative amounts by weight of 1/1;

(37) A composition described in (33), wherein the polybutylene terephthalate resin is a resin produced by continuous polycondensation using terephthalic acid and 1,4-butanediol as main raw materials;

(38) A composition described in (31), which comprises the fatty acid ester in an amount of 0.01 to 2 parts by weight per 100 parts by weight of the polybutylene terephthalate resin;

(39) A polybutylene terephthalate resin composition which comprises a polybutylene terephthalate resin which has a crystallization temperature in a temperature decrease of 175° C. or higher as measured by a differential scanning calorimeter at a rate of the temperature decrease of 20° C./min and an amount of residual tetrahydrofuran of 300 ppm by weight or less in the polybutylene terephthalate resin, and a fatty acid ester which has a residue group of a fatty acid having 12 to 36 carbon atoms and a residue group of an alcohol having 1 to 36 carbon atoms;

(40) A composition described in (39), wherein the polybutylene terephthalate resin has an intrinsic viscosity of 0.5 to 1.5 dl/g as measured at 30° C. in a mixed solvent composed of phenol and 1,1,2,2-tetrachloroethane in relative amounts by weight of 1/1;

(41) A composition described in (39), wherein the polybutylene terephthalate resin is a resin produced by continuous polycondensation using terephthalic acid and 1,4-butanediol as main raw materials; and (42) A molded article obtained by molding the polybutylene terephthalate resin described in (1).

BRIEF DESCRIPTION OF THE DRAWINGS

The numbers in FIG. 1 have the following meanings:
1: A slurry preparation tank
2: A first esterification reactor
3: A second esterification reactor
4: A first polycondensation reactor
5: A second polycondensation reactor
6: A pelletizer

DESCRIPTION OF THE PREFERRED EMBODIMENTS

The polybutylene terephthalate resin of the present invention has the structure represented by the following formula as the main repeating unit and carboxyl group and hydroxyl group at the ends of the chain.

As the first embodiment of the polybutylene terephthalate of the present invention, the polybutylene terephthalate resin has 30 eq/t or less of carboxyl end group and a crystallization temperature in a temperature decrease of 175° C. or higher as measured by a differential scanning calorimeter at a rate of the temperature decrease of 20° C./min. In the first embodiment, it is preferable that the amount of residual tetrahydrofuran in the resin is 300 ppm by weight or less. As the second embodiment of the polybutylene terephthalate of the present invention, the polybutylene terephthalate resin has a crystallization temperature in a temperature decrease of 175° C. or higher as measured by a differential scanning calorimeter at a rate of the temperature decrease of 20° C./min and an amount of residual tetrahydrofuran of 300 ppm by weight or less in the polybutylene terephthalate resin. In these embodiments, it is preferable that at least one of glass fiber, antioxidants and mold-releasing agents is added to the resin in accordance with the object. In the present invention, the amount of carboxyl end group of the polybutylene terephthalate resin is 30 eq/t or less and preferably 25 eq/t or less. The amount of carboxyl end group can be obtained by dissolving the polybutylene terephthalate resin into an organic solvent, followed by titrating the obtained solution with a solution of an alkali hydroxide. Specifically, pellets of the resin is dissolved into benzyl alcohol and the amount of carboxyl group is determined with an aqueous solution of sodium hydroxide by the acid-alkali titration. By reducing the amount of carboxyl group in the polybutylene terephthalate resin to 30 eq/t or less, resistance to hydrolysis of the polybutylene terephthalate resin composition can be enhanced. Since carboxyl group in the polybutylene terephthalate resin works as a self-catalyst for hydrolysis of the polybutylene terephthalate resin, hydrolysis starts early when carboxyl end group is present in an amount exceeding 30 eq/t. By the effect of the formed carboxyl group as the self-catalyst, the hydrolysis proceeds in a manner like a chain reaction and the degree of polymerization of the polybutylene terephthalate resin rapidly decreases. By reducing the amount of carboxyl end group to 30 eq/t or less, the early hydrolysis can be suppressed even under conditions of high temperatures and high humidities.

In the present invention, the crystallization temperature in a temperature decrease is 175° C. or higher and preferably 177° C. or higher. The crystallization temperature of the polybutylene terephthalate resin in a temperature decrease is the temperature of the exothermic peak due to crystallization which is obtained by cooling the polymer in the melted condition at the rate of the decrease in the temperature of 20° C./min using the differential scanning calorimeter. The crystallization temperature in a temperature decrease changes in parallel with the crystallization rate, i.e., the higher the crystallization temperature in a temperature decrease, the greater the crystallization rate. When the crystallization temperature in a temperature decrease is 175° C. or higher, the cooling time after injection molding can be decreased and productivity can be increased. When the crystallization temperature in a temperature decrease is lower than 175° C., it takes time for crystallization in injection molding and it is inevitable that the cooling time is increased. There is the possibility that this causes a longer molding cycle and a decrease in productivity. The molding cycle can be evaluated by the easiness of releasing a molded article from a mold and the presence or the absence of deformation left by the pushing pin when the injection molding is conducted under a prescribed condition. When the crystallization rate is small, deformation is formed by the pushing pin. When the crystallization rate is still smaller, the release of the molded article becomes impossible.

The upper limit of the crystallization temperature is not particularly limited. The upper limit is a temperature below the melting point of the polybutylene terephthalate resin.

In the present invention, the amount of residual tetrahydrofuran in the polybutylene terephthalate resin is 300 ppm by weight or less and preferably 200 ppm by weight or less. The amount of residual tetrahydrofuran in the polybutylene terephthalate resin can be obtained by dipping pellets of the resin into water and treating at 120° C. for 6 hours, followed by determining the amount of tetrahydrofuran eluted into water in accordance with the gas chromatography. By adjusting the amount of residual tetrahydrofuran in the polybutylene terephthalate resin at 300 ppm or less, generation of gases such as tetrahydrofuran can be suppressed in the use of the molded article of the resin composition at a high temperature and the molded article can be used advantageously for members of electric and electronic products such as relays without the possibility of corrosion at electric contacts. When the amount of residual tetrahydrofuran in the polybutylene terephthalate resin exceeds 300 ppm by weight, generation of gases such as tetrahydrofuran increases in the use of the molded article of the resin composition at a high temperature and there is the possibility that corrosion of metals takes place.

The lower limit of the amount of residual tetrahydrofuran is not particularly limited. In general, the lower limit is about 50 ppm. The amount of generated organic gases under heating of a molded article is smaller when the amount of residual tetrahydrofuran is smaller. However, the amount of generated organic gases is not proportional to the amount of residual tetrahydrofuran. In ordinary applications, for example, in members of electric and electronic products such as relays, it is not particularly required that the amount of residual tetrahydrofuran is less than 50 ppm. It may also be considered from the description in Japanese Patent Application Laid-Open No. Heisei 8(1996)-209004 shown above that the presence of tetrahydrofuran in a small amount may work as a protective component for electric contacts.

It is preferable that the polybutylene terephthalate resin of the present invention has an intrinsic viscosity of 0.5 to 1.5 dl/g, more preferably 0.6 to 1.3 dl/g and most preferably 0.7 to 1.1 dl/g as measured at 30° C. in a mixed solvent composed of phenol and 1,1,2,2-tetrachloroethane in relative amounts by weight of 1/1. When the intrinsic viscosity is smaller than 0.5 dl/g, there is the possibility that mechanical strength of the molded article prepared from the resin composition is insufficient. When the intrinsic viscosity exceeds 1.5 dl/g, melt viscosity increases and there is the possibility that the molding property becomes poor due to a decrease in fluidity.

It is preferable that the polybutylene terephthalate resin of the present invention has an amount of residual carboxyl end group of 30 eq/t or less, a crystallization temperature in a temperature decrease of 175° C. and an amount of residual tetrahydrofuran of 300 ppm by weight or less in the polybutylene terephthalate resin.

The raw materials for the polybutylene terephthalate resin of the present invention are not particularly limited. It is preferable that the polybutylene terephthalate resin is produced by using terephthalic acid and 1,4-butanediol as the main raw materials. The main raw materials mean that terephthalic acid occupies 50% by mole or more of the entire dicarboxylic acid components and 1,4-butanediol occupies 50% by mole or more of the entire diol components. It is more preferable that terephthalic acid occupies 80% by mole or more and most preferably 95% by mole of the entire dicarboxylic acid components. It is more preferable that 1,4-butanediol occupies 80% by mole or more and most preferably 95% by mole of more of the entire diol components.

In the present invention, dicarboxylic acid components other than terephthalic acid are not particularly limited. Examples of the other dicarboxylic acid include aromatic dicarboxylic acids such as phthalic acid, isophthalic acid, 4,4'-diphenyldicarboxylic acid, 4,4'-diphenyl ether dicarboxylic acid, 4,4'-benzophenonedicarboxylic acid, 4,4'-diphenoxy-ethanedicarboxylic acid, 4,4'-diphenyl sulfone dicarboxylic acid and 2,6-naphthalenedicarboxylic acid; alicyclic dicarboxylic acids such as 1,2-cyclohexanedicarboxylic acid, 1,3-cyclohexanedicarboxylic acid and 1,4-cyclohexanedicarboxylic acid; and aliphatic dicarboxylic acids such as malonic acid, succinic acid, glutaric acid, adipic acid, pimellic acid, suberic acid, azeraic acid and sebacic acid.

In the present invention, diol components other than 1,4-butanediol are not particularly limited. Examples of the other diol component include aliphatic diols such as ethylene glycol, diethylene glycol, polyethylene glycol, propylene glycol, 1,3-propanediol, 1,5-pentanediol, neopentyl glycol, 1,6-hexanediol, 1,8-octanediol and polytetramethylene ether glycol; alicyclic diols such as 1,2-cyclohexanediol, 1,4-cyclohexanediol, 1,1-cyclohexanedimethylol and 1,4-cyclohexanedimethylol; and aromatic diols such as xylylene glycol, 4,4'-dihydroxybiphenyl, 2,2-bis(4-hydroxyphenyl) propane and bis(4-hydroxyphenyl) sulfone.

In the present invention, monofunctional components and polyfuntional components may also be used as the components of copolycondensation. Examples of the monofunctional component include hydroxycarboxylic acids such as glycolic acid, m-hydroxybenzoic acid, p-hydroxybenzoic acid, 6-hydroxy-2-naphthalenecarboxylic acid and p-β-hydroxyethoxybenzoic acid; alkoxycarboxylic acids; stearyl alcohol; benzyl alcohol; stearic acid; benzoic acid; t-butylbenzoic acid; and benzoylbenzoic acid. Examples of the polyfunctional component include tricarballylic acid, trimellitic acid, trimesic acid, pyromellitic acid, gallic acid, trimethylolethane, trimethylolpropane, glycerol and pentaerythritol.

It is preferable that the polybutylene terephthalate resin of the present invention is a resin obtained by continuous polymerization of the dicarboxylic acid components comprising terephthalic acid as the main component and the diol components comprising 1,4-butanediol as the main component. The process for continuous polymerization used for producing the polybutylene terephthalate resin of the present invention is not particularly limited. It is preferable that the continuous polymerization is conducted using reactors of the tank type which are connected to each other in series. For example, the polymerization can be conducted as follows: in one or a plurality of esterification reactors, the esterification is conducted in the presence of an esterification catalyst at a temperature preferably of 150 to 280° C. and more preferably of 180 to 265° C. under a pressure preferably of 6.67 to 133 kPa and more preferably of 9.33 to 101 kPa under stirring for 2 to 5 hours; the obtained oligomer as the reaction product of esterification is transferred to a polycondensation reactor; and, in one or a plurality of polycondensation reactors, the polycondensation is conducted in the presence of a polycondensation catalyst at a temperature preferably of 210 to 280° C. and more preferably of 220 to 265° C. under a vacuum preferably of 26.7 kPa or smaller and more preferably of 20 kPa or smaller under stirring for 2 to 5 hours. It is preferable that the polybutylene terephthalate resin obtained by the polycondensation is taken out via a polymer outlet die at the bottom of the polycondensation reactor in the form of strands and cut by a pelletizer while being cooled or after being cooled to form a granular product such as pellets.

The type of the esterification reactor used for producing the polybutylene terephthalate resin of the present invention is not particularly limited. Examples of the esterification reactor include vertical complete mixing reactors with stirring, vertical mixing reactors of the convection type and continuous reactors of the column type. As the esterification reactor, a single reactor or a plurality of reactors of the same type or different types which are connected in series may be used. The type of the polycondensation reactor is not particularly limited. Examples of the polycondensation reactor include vertical stirred reactors, horizontal stirred reactors and reactors of the thin film vaporization type. As the polycondensation reactor, a single reactor or a plurality of reactors of the same type or different types which are connected in series may be used.

Figure 1:
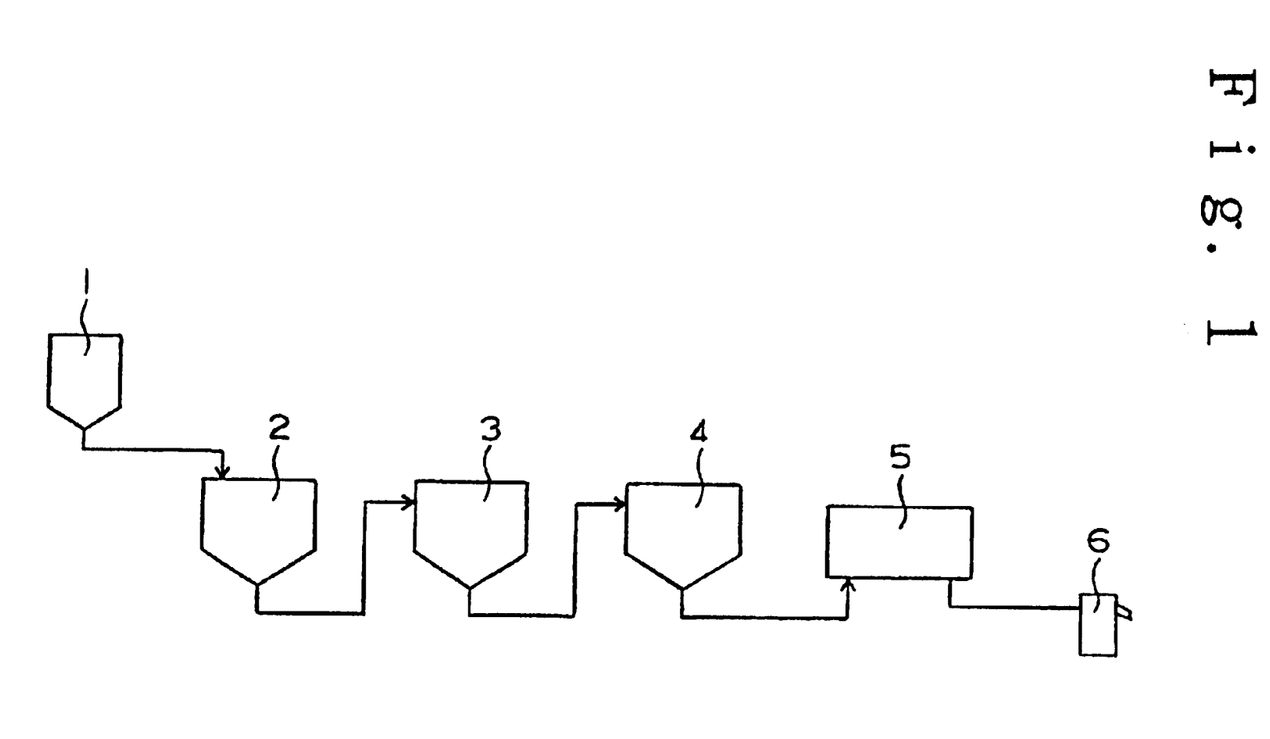
FIG. 1 shows a process flow diagram of an embodiment of the apparatus for producing the polybutylene terephthalate resin of the present invention.

FIG. 1 shows a process flow diagram of an embodiment of the apparatus for producing the polybutylene terephthalate of the present invention. Terephthalic acid, 1,4-butanediol and an esterification catalyst are supplied to a slurry preparation tank 1 and mixed under stirring and a slurry is prepared. The prepared slurry is continuously transferred to a first esterification reactor 2 and an oligomer is formed by the esterification. In FIG. 1, attached apparatuses such as pumps, distillation columns and cooling baths are not shown for simplification. The oligomer is continuously transferred from the first esterification reactor to a second esterification reactor 3. 1,4-Butanediol is removed by distillation and an oligomer having a greater molecular weight is formed. The oligomer in the second esterification reactor is continuously transferred to a first polycondensation reactor 4 and the polycondensation is conducted to form a prepolymer. The prepolymer in the first polycondensation reactor is continuously transferred to a second polycondensation reactor 5. The polycondensation is conducted and the polybutylene terephthalate resin having the prescribed degree of polymerization is formed. The formed polybutylene terephthalate resin is transferred from the bottom of the second polycondensation reactor to a die, taken out in the form of strands and cut by a pelletizer 6 to form pellets.

The esterification catalyst used for producing the polybutylene terephthalate resin of the present invention is not particularly limited. Examples of the esterification catalyst include titanium compounds, tin compounds, magnesium compounds and calcium compounds. Among these compounds, titanium compounds are preferably used. Examples of the titanium compound used as the esterification catalyst include titanium alcoholates such as tetramethyl titanate, tetraisopropyl titanate and tetrabutyl titanate; and titanium phenolates such as tetraphenyl titanate. It is preferable that the amount of the titanium compound catalyst is 30 to 300 ppm by weight and more preferably 50 to 200 ppm by weight as titanium atom based on the calculated yield of the polybutylene terephthalate resin.

As the polycondensation catalyst used for producing the polybutylene terephthalate resin of the present invention, the esterification catalyst added for the esterification may be used for the polycondensation without adding other catalysts or a catalyst which is the same as or different from the esterification catalyst added for the esterification may be further added. For example, when tetrabutyl titanate is further added, it is preferable that the amount of the added tetrabutyl titanate is 300 ppm by weight or less and more preferably 150 ppm by weight or less as titanium atom based on the calculated yield of the polybutylene terephthalate resin. Examples of the polycondensation catalyst different from the esterification catalyst include antimony compounds such as antimony trioxide and germanium compounds such as germanium dioxide and germanium tetraoxide.

In the esterification and/or the polycondensation, auxiliary agents for the reaction may be present in combination with the above catalyst. Examples of the auxiliary agent include phosphorus compounds such as orthophosphoric acid, phosphorous acid, hypophosphorous acid, polyphosphoric acid and esters and metal salts of these phosphorus compounds; and compounds of alkali metals and alkaline earth metals such as sodium hydroxide, sodium benzoate, magnesium acetate and calcium acetate.

The polybutylene terephthalate resin may be produced in accordance with a process using transesterification between dimethyl terephthalate and 1,4-butanediol or a process of direct esterification of terephthalic acid and 1,4-butanediol. In the present invention, the cost of raw materials can be reduced by using the process of direct esterification using terephthalic acid and 1,4-butanediol as the raw materials. The polybutylene terephthalate resin having a higher crystallization temperature in a temperature decrease can be obtained more easily in accordance with the process of direct esterification using terephthalic acid and 1,4-butanediol as the raw materials than in accordance with the process using transesterification.

The polybutylene terephthalate resin may be produced in accordance with the batch process or the continuous process. In the batch process, the transesterification or the esterification and the polycondensation are conducted batchwise. In the continuous process, the esterification and the polycondensation are conducted continuously. In the present invention, by conducting the continuous polycondensation of terephthalic acid and 1,4-butanediol, a decrease in the molecular weight, an increase in the amount of carboxyl end group or an increase in the amount of residual tetrahydrofuran does not take place with time after the reaction is completed and the resin is taken out of the reactor and the polybutylene terephthalate resin having a high quality can be easily obtained.

Reinforcing fillers may be added to the polybutylene terephthalate resin of the present invention. The added reinforcing filler is not particularly limited. Examples of the reinforcing filler include inorganic fibers such as glass fiber, carbon fiber, silica-alumina fiber, zirconia fiber, boron fiber, boron nitride fiber, silicon nitride potassium titanate fiber and metal fibers; and organic fibers such as aromatic polyamide fibers and fluororesin fibers. The reinforcing fillers may be used singly or in combination of two or more. Among these reinforcing fillers, inorganic fibers are preferable and glass fiber is more preferable.

The glass fiber used in the present invention is not particularly limited. Examples of the glass fiber include fibers of E glass, C glass, A glass, S glass and S-2 glass. Among these glass fibers, glass fiber of E glass is preferable due to a small alkali content and excellent electric properties. The average diameter of the glass fiber used in the present invention is not particularly limited. It is preferable that the average diameter is 1 to 100 $\mu$m, more preferably 2 to 50 $\mu$m, still more preferably 3 to 30 $\mu$m and most preferably 5 to 20 $\mu$m. A glass fiber having an average diameter smaller than 1 $\mu$m cannot be easily produced and there is the possibility that the cost increases. When the average diameter of the glass fiber exceeds 100 $\mu$m, there is the possibility that tensile strength of the glass fiber decreases. The average length of the glass fiber used in the present invention is not particularly limited. It is preferable that the average length is 0.1 to 20 mm and more preferably 1 to 10 mm. When the average length of the glass fiber is smaller than 0.1 mm, there is the possibility that the reinforcing effect of the glass fiber is not sufficiently exhibited. When the average length of the glass fiber exceeds 20 mm, there is the possibility that mixing with the polybutylene terephthalate resin in the melted condition or molding of the polybutylene terephthalate resin composition containing the glass fiber becomes difficult.

In the present invention, the content of the glass fiber is not particularly limited. It is preferable that the content of the glass fiber is 3 to 150 parts by weight and more preferably 5 to 100 parts by weight per 100 parts by weight of the polybutylene terephthalate resin. When the content of the glass fiber is smaller than 3 parts by weight per 100 parts by weight of the polybutylene terephthalate resin, there is the possibility that the reinforcing effect of the glass fiber is not sufficiently exhibited. When the content of the glass fiber exceeds 150 parts by weight per 100 parts by weight of the polybutylene terephthalate resin, there is the possibility that mixing with the polybutylene terephthalate resin in the melted condition or molding of the polybutylene terephthalate resin composition becomes difficult.

It is preferable that the glass fiber used in the present invention is a glass fiber treated with a surface treatment agent. By treating the surface of the glass fiber with the surface treatment agent, strong adhesion or bonding is formed at the interface of the polybutylene terephthalate and the glass fiber. Therefore, stress is transferred from the polybutylene terephthalate to the glass fiber and the reinforcing effect of the glass fiber is exhibited. The surface treatment agent is not particularly limited. Examples of the surface treatment agent include chlorosilane compounds such as vinyltrichlorosilane and methylvinyldichlorosilane; alkoxysilane compounds such as vinyltrimethoxysilane, vinyltriethoxysilane, vinyltriacetoxysilane and $\gamma$-methacryloxypropyltrimethoxysilane; epoxy-silane compounds such as $\beta$-(3,4-epoxycyclohexyl) ethyltrimethoxysilane and $\gamma$-glycidoxypropyltrimethoxysilane; acrylic compounds; isocyanate compounds; titanate compounds; and epoxy compounds.

It is preferable that the glass fiber used in the present invention is a glass fiber treated with a sizing agent. By treating the glass fiber with a sizing agent, workability in handling the glass fiber is improved and damages on the glass fiber can be prevented. The sizing agent is not particularly limited. Examples of the sizing agent include emulsions of resins such as vinyl acetate resins, ethylene-vinyl acetate copolymer resins, acrylic resins, epoxy resins, polyurethane resins and polyester resins.

To the polybutylene terephthalate resin composition of the present invention comprising glass fiber, other fillers may also be added in combination with the reinforcing filler. Examples of the other filler include inorganic fillers having a plate shape, ceramic beads, wollastonite, talc, clay, mica, zeolite, kaolin, potassium titanate, barium sulfate, titanium oxide, silicon oxide, aluminum oxide and magnesium hydroxide. By adding an inorganic filler having a plate shape, anisotropy and warp in the molded article can be decreased. Preferable examples of the inorganic filler having a plate shape include glass flakes, mica and metal foils. Among these inorganic fillers having a plate shape, glass flakes are more preferably used.

To the polybutylene terephthalate resin of the present invention, antioxidants may be added. As the antioxidant, phenolic antioxidants are preferable. In the present invention, the phenolic antioxidant means an antioxidant having phenolic hydroxyl group. A hindered phenolic antioxidant means an antioxidant in which one or two carbon atoms adjacent to the carbon atom on the aromatic ring to which phenolic hydroxyl group is bonded are substituted with a group having 4 or more carbon atoms. The substituent group having 4 or more carbon atoms may be bonded to the carbon atom on the aromatic ring through the carbon—carbon bond or through an atom other than carbon atom. Examples of the phenolic antioxidant used in the present invention include phenolic antioxidants which are not hindered phenolic antioxidants such as p-cyclohexylphenol, 3-t-butyl-4-methoxyphenol, 4,4'-isopropylidenediphenol and 1,1-bis(4-hydroxyphenyl)cyclohexane; and hindered phenolic antioxidants such as 2-t-butyl-4-methoxyphenol, 2,6-di-t-butyl-p-cresol, 2,4,6-tri-t-butylphenol, 4-hydroxymethyl-2,6-di-t-butylphenol, phenol modified with styrene, 2,5-di-t-butylhydroquinone, octadecyl-3-(3,5-di-t-butyl-4-hydroxyphenyl) propionate, triethylene glycol bis[3-(3-t-butyl-5-methyl-4-hydroxyphenyl) propionate], 1,6-hexanediol bis [3-(3,5-di-t-butyl-4-hydroxyphenyl) propionate], pentaerythritol tetrakis[3-(3,5-di-t-butyl-4-hydroxyphenyl) propionate], 2,2'-methylenebis(4-methyl-6-t-butylphenol), 2,2'-methylenebis(6-t-butyl-4-ethylphenol), 2, 2'-methylenebis[4-methyl-6-(1,3,5-trimethylhexyl) phenol], 4,4'-methylenebis(2,6-di-t-butylphenol), 4,4'-butylidenebis(3-methyl-6-t-butylphenol), 2,6-bis(2-hydroxy-3-t-butyl-5-methylbenzyl)-4-methylphenol, 1,1,3-tris [2-methyl-4-hydroxy-5-t-butyl-phenyl]butane, 1,3,5-trimethyl-2,4,6-tris [3,5-di-t-butyl-4-hydroxy-benzyl]-benzene, tris(3,5-di-t-butyl-4-hydroxybenzyl) isocyanurate, tris [3-(3,5-di-t-butyl-4-hydroxyphenyl)propionyloxyethyl] isocyanurate, 4,4'-thiobis(3-methyl-6-t-butylphenol), 2,2'-thiobis(4-methyl-6-t-butylphenol), 4,4'-thiobis(2-methyl-6-t-butylphenol and thiobis(β-naphthol). Among these phenolic antioxidants, hindered phenolic antioxidants can be advantageously used as the radical trapping agent since the hindered phenolic antioxidants themselves tend to become stable radicals. It is preferable that the hindered phenolic antioxidant has a molecular weight of 200 or greater and more preferably 500 or greater.

In the polybutylene terephthalate resin composition of the present invention, the content of the phenolic antioxidant is 0.001 to 2 parts by weight and more preferably 0.003 to 1 part by weight per 100 parts by weight of the polybutylene terephthalate resin. When the content of the phenolic antioxidant is less than 0.001 part by weight per 100 parts by weight of the polybutylene terephthalate resin, there is the possibility that the antioxidation effect is not sufficiently exhibited. When the content exceeds 2 parts by weight per 100 parts by weight of the polybutylene terephthalate resin, there is the possibility that stability under heating and oxidation deteriorates or decomposition of the resin takes place during mixing in the melted condition.

In the polybutylene terephthalate resin of the present invention which comprises the antioxidants, one or more antioxidants selected from the group consisting of sulfur-based antioxidants and phosphorus-based antioxidants may be comprised in combination with the phenolic antioxidants. By adding one or more antioxidants selected from the group consisting of sulfur-based antioxidants and phosphorus-based antioxidants in combination with the phenolic antioxidants, resistance to heat aging of the resin composition can be improved and retentions of color tone, tensile strength and elongation can also be improved. In the present invention, the sulfur-based antioxidant means an antioxidant which has no phenolic hydroxyl group but has sulfur atom. The phosphorus-based antioxidant means an antioxidant which has no phenolic hydroxyl group or sulfur atom but has phosphorus atom.

Examples of the sulfur-based antioxidant comprised in the polybutylene terephthalate resin composition of the present invention include didodecyl thiodipropionate, ditetradecyl thiodipropionate, dioctadecyl thiodipropionate, pentaerythritol tetrakis(3-dodecyl thiopropionate), thiobis(N-phenyl-β-naphthylamine), 2-mercapto-benzothiazole, 2-mercaptobenzimidazole, tetramethylthiuram monosulfide, tetramethylthiuram disulfide, nickel dibutyldithiocarbamate, nickel isopropylxanthate and trilauryl trithiophosphite. Among these sulfur-based antioxidants, thioether-based antioxidants having the thioether structure are preferable. It is preferable that the sulfur-based antioxidant has a molecular weight of 200 or greater and more preferably 500 or greater.

In the composition of the present invention, it is preferable that the content of the sulfur-based antioxidant is 0.001 to 1.9 parts by weight and more preferably 0.003 to 1 part by weight per 100 parts by weight of the polybutylene terephthalate resin. When the content of the sulfur-based antioxidant is less than 0.001 part by weight per 100 parts by weight of the polybutylene terephthalate resin, there is the possibility that the antioxidation effect is not sufficiently exhibited. When the content of the sulfur-based antioxidant exceeds 1.9 parts by weight per 100 parts by weight of the polybutylene terephthalate resin, there is the possibility that stability under heating and oxidation deteriorates or decomposition of the resin takes place during mixing in the melted condition.

It is preferable that the phosphorus-based antioxidant has the structure represented by the formula: $P(OR)_3$. In this formula, R represents an alkyl group, an alkylene group, an aryl group or an arylene group, the three groups represented by R may be the same with or different from each other and two groups represented by R may form a ring structure. Examples of the phosphorus-based antioxidant include triphenyl phosphite, diphenyl decyl phosphite, phenyl diisodecyl phosphite, tri(nonylphenyl) phosphite, bis(2,4-di-t-butyl-phenyl)pentaerythritol diphosphite and bis(2,6-di-t-butyl-4-methyl-phenyl)pentaerythritol diphosphite.

In the composition of the present invention, it is preferable that the content of the phosphorus-based antioxidant is 0.001 to 1.9 parts by weight and more preferably 0.003 to 1 parts by weight per 100 parts by weight of the polybutylene terephthalate resin. When the content of the phosphorus-based antioxidant is less than 0.001 part by weight per 100 parts by weight of the polybutylene terephthalate resin, there is the possibility that the antioxidation effect is not sufficiently exhibited. When the content of the phosphorus-based antioxidant exceeds 1.9 parts by weight per 100 parts by weight of the polybutylene terephthalate resin, there is the possibility that stability under heating and oxidation deteriorates or decomposition of the resin takes place during mixing in the melted condition.

By adding the phosphorus based antioxidant to the polybutylene terephthalate resin of the present invention, resistance to heat aging can be improved and, in particular, deterioration in color tone can be prevented. It is known that, in general, resistance to hydrolysis which is the important property for polyester resins such as the polybutylene terephthalate resin is adversely affected by addition of a phosphorus-based antioxidant. However, when the phosphorus-based antioxidant is used in combination with the polybutylene terephthalate resin of the present invention which has the specific physical properties, the decreases in resistance to heat aging and resistance to hydrolysis are suppressed and can be hardly recognized unlike the case of the system obtained by adding the phosphorus-based antioxidant to a conventional polyester resin.

In the composition of the present invention, the ratio of the sulfur-based antioxidant and/or the phosphorus-based antioxidant to the phenolic antioxidant is not particularly limited. It is preferable that the content of the sulfur-based antioxidant and/or the phosphorus-based antioxidant is 0.2 to 5 parts by weight per 1 part by weight of the phenolic antioxidant. When the content of the sulfur-based antioxidant and/or the phosphorus-based antioxidant is smaller than 0.2 parts by weight or exceeds 5 parts by weight, there is the possibility that the effect of improving resistance to heat aging and resistance to hydrolysis decreases.

In the composition of the present invention, when the sulfur-based antioxidant and/or the phosphorus-based antioxidant is comprised in combination with the phenolic antioxidant, it is preferable that the total amount of the antioxidants is 2 parts by weight or smaller per 100 parts by weight of the polybutylene terephthalate resin. When the total amount of the antioxidants exceeds 2 parts by weight, there is the possibility that stability under heating and oxidation deteriorates or decomposition of the resin takes place during mixing in the melted condition.

To the polybutylene terephthalate resin of the present invention, a mold-releasing agent may be added. As the mold-releasing agent, it is possible that conventional mold-releasing agents for resins such as polyethylene waxes and silicone oils are used. However, it is preferable, in particular, that a mold-releasing agent selected from fatty acids esters having a residue group of a fatty acid having 12 to 36 carbon atoms and a residue group of an alcohol having 1 to 36 carbon atoms is added to the polybutylene terephthalate resin of the present invention. It is more preferable that the mold-releasing agent is selected from fatty acid esters having a residue group of a fatty acid having 16 to 32 carbon atoms and a residue group of an alcohol having 1 to 20 carbon atoms.

Examples of the fatty acid forming the fatty acid ester used in the present invention include lauric acid, myristic acid, palmitic acid, stearic acid, arachic acid, behenic acid, lignoceric acid, cerotic acid, montanic acid, melissic acid and lacceric acid. When the number of carbon atoms in the residue group of a fatty acid is fewer than 12, the mold-releasing property is poor and fouling of a mold tends to take place due to greater volatility. When the number of carbon atoms in the residue group of a fatty acid exceeds 36, there is the possibility that the effect of improving the mold-releasing property is not sufficiently exhibited.

As the alcohol for forming the fatty acid ester used in the present invention, monohydric alcohols and polyhydric alcohols having a functionality of two or greater can be used. Examples of the alcohol include monohydric alcohols such as methanol, ethanol, propanol, isopropanol, butanol, isobutanol, pentanol, hexanol, cyclohexanol, heptanol, octanol, lauryl alcohol and stearyl alcohol; dihydric alcohols such as ethylene glycol, propylene glycol, 1,3-propanediol, 1,4-butanediol, 1,6-hexanediol and 1,4-cyclohexanediol; trihydric alcohols such as glycerol and trimethylolpropane; and tetrahydric alcohols such as pentaerythritol and erythritol. When the number of carbon atoms of the residue group of the alcohol exceeds 36, there is the possibility that the effect of improving the mold-releasing property is not sufficiently exhibited.

The process for producing the fatty acid ester used in the present invention is not particularly limited. For example, using a fatty acid and an alcohol as the raw materials, esterification may be conducted in the presence of an acid catalyst such as sulfuric acid, hydrochloric acid and p-toluenesulfonic acid. The ester can also be produced by the reaction of a fatty acid chloride and an alcohol or, when the alcohol forming the fatty acid ester is an alcohol having a high boiling point, by transesterification between a lower alkyl ester of a fatty acid and the alcohol having a high boiling point.

Examples of the fatty acid ester used in the present invention include methyl laurate, methyl myristate, methyl palmitate, methyl stearate, methyl oleate, methyl behenate, methyl montanate, isopropyl myristate, isopropyl palmitate, butyl laurate, butyl stearate, octyl palmitate, octyl stearate, lauryl laurate, stearyl stearate, ethylene glycol dilaurate, ethylene glycol dipalmitate, ethylene glycol distearate, ethylene glycol dimontanate, propylene glycol monolaurate, propylene glycol monostearate, 1,3-propanediol dilaurate, 1,3-propanediol distearate, 1,3-propanediol dimontanate, 1,4-butanediol dilaurate, 1,4-butanediol distearate, 1,4-butanediol dimontanate, glycerol monopalmitate, glycerol monostearate, glycerol monomontanate, glycerol dipalmitate, glycerol distearate, glycerol dioleate, glycerol tristearate, glycerol trioleate, pentaerythritol monopalmitate, pentaerythritol monostearate, pentaerythritol dipalmitate, pentaerythritol distearate, pentaerythritol tripalmitate, pentaerythritol tristearate and pentaerythritol tetrastearate.

In the polybutylene terephthalate resin composition of the present invention which comprises the mold-releasing agent, it is preferable that the content of the fatty acid ester having a residue group of a fatty acid having 12 to 36 carbon atoms and a residue group of an alcohol having 1 to 36 carbon atoms is 0.01 to 2 parts by weight and more preferably 0.1 to 1 part by weight per 100 parts by weight of the polybutylene terephthalate resin of the present invention. The polybutylene terephthalate resin composition of the present invention which comprises the specific fatty acid ester exhibits an improved mold-releasing property and the molding cycle can be further reduced. When the content of the fatty acid ester is less than 0.01 part by weight per 100 parts by weight of the polybutylene terephthalate resin, there is the possibility that the effect of improving the mold-releasing property is not sufficiently exhibited. When the content of the fatty acid ester exceeds 2 parts by weight per 100 parts by weight of the polybutylene terephthalate resin, the effect of improving the mold-releasing property is not exhibited to the degree expected from the increase in the amount of the fatty acid ester and there is the possibility that strength and heat resistance decreases.

The process for adding the glass fiber, the antioxidant and the mold-releasing agent to the polybutylene terephthalate resin of the present invention is not particularly limited. It is preferable that these fillers and agents are added by mixing with the polybutylene terephthalate resin in the melted condition. To this process, a mixing process conventionally used for a thermoplastic resin can be applied. For the mixing, for example, the components of the composition and, where necessary, other components used in combination are uniformly mixed by a Henschel mixer, a ribbon blender or a V-shape blender and then further mixed by a single screw extruder, a multi-screw extruder, rolls, a Banbury mixer, a Laboplastomill or a Brabender. The components including the other component used in combination can be supplied to the mixer together or separately and successively. Two or more components selected from the all components and the other components may also mixed together in advance.

To the polybutylene terephthalate resin composition of the present invention, a flame retardant may be added to provide the composition with the flame retarding property. The flame retardant is not particularly limited. Examples of the flame retardant include organic halogen compounds, antimony compounds, phosphorus compounds, other organic flame retardants and other inorganic flame retardants. Examples of the organic halogen compound include brominated polycarbonates, brominated epoxy resins, brominated phenoxy resins, brominated polyphenylene ether resins, brominated polystyrene resins, brominated bisphenol A and pentabromobenzyl polyacrylate. Examples of the antimony compound include antimony trioxide, antimony pentaoxide and sodium antimonate. Examples of the phosphorus compound include esters of phosphoric acid, polyphosphoric acid, ammonium polyphosphate and red phosphorus. Examples of the other organic flame retardant include nitrogen compounds such as melamine and cyanuric acid. Examples of the other inorganic flame retardant include aluminum hydroxide, magnesium hydroxide, silicon compounds and boron compounds.

To the polybutylene terephthalate resin of the present invention, conventional additives other than those described above may be added, where necessary. These additives are not particularly limited. For example, additives such as stabilizers such as heat stabilizers, lubricants, catalyst deactivators, nucleating agents for crystallization and promoters for crystallization can be added during the polymerization or after the polymerization. To provide the polybutylene terephthalate resin with the desired properties, ultraviolet absorbents, stabilizers such as weathering stabilizers, coloring agents such as dyes, antistatic agents, foaming agents, plasticizers and impact resistance improvers can be added.

To the polybutylene terephthalate resin of the present invention, where necessary, other thermoplastic resins such as polyethylene, polypropylene, acrylic resins, polycarbonates, polyamides, polyphenylene sulfide, polyethylene terephthalate, liquid crystalline polyesters, polyacetals and polyphenylene oxide and thermosetting resins such as phenol resins, melamine resins, silicone resins and epoxy resins may be added when a molded article is prepared. The thermoplastic resin and the thermosetting resin may be used singly or in combination of two or more.

The process of molding to prepare the molded article of the polybutylene terephthalate resin of the present invention is not particularly limited. A molding process conventionally used for thermoplastic resins such as the injection molding, the blow molding, the extrusion molding and the compression molding can be applied.

Since the polybutylene terephthalate resin and the molded article of the present invention has a reduced amount of carboxyl end group, a high crystallization temperature in a temperature decrease and a reduced amount of residual tetrahydrofuran, the polybutylene terephthalate resin can be molded in a short molding cycle, exhibits excellent resistance to hydrolysis and there is no possibility of causing corrosion at contacts in members of electric and electronic products. The resin compositions and the molded articles of the present invention which comprise the glass fiber, the antioxidants and the mold releasing agents in accordance with the object of the use exhibit stability under heating and oxidation, heat resistance and the mold releasing property further improved to higher degrees and can be applied to members of electric and electronic products and automobiles.

To summarize the advantages of the present invention, the polybutylene terephthalate resin of the present invention can be molded in a short molding cycle, exhibits excellent resistance to hydrolysis and mold-releasing property and generates little gas during molding. By adding glass fiber, antioxidants and mold-releasing agents to the above resin in accordance with the object, the polybutylene terephthalate resin compositions and the molded articlea which exhibit further improved impact resistance, stability under heating and oxidation and mold-releasing property can be obtained. The compositions and the articles can be advantageously used for wide applications such as members in electric and electronic products and in automobiles.

EXAMPLES

The present invention will be described more specifically with reference to examples in the following. However, the present invention is not limited to the examples.

In Examples and Comparative Examples, the evaluation of a polybutylene terephthalate resin was conducted in accordance with the following methods.
(1) The Amount of Carboxyl End Group A polybutylene terephthalate resin in an amount of 0.1 g was dissolved into 3 ml of benzyl alcohol and the obtained solution was titrated with a 0.1 mole/liter benzyl alcohol solution of sodium hydroxide.
(2) Crystallization Temperature in a Temperature Decrease Using a differential scanning calorimeter [manufactured by PERKIN ELMER Company; Model 1B], the temperature of a sample was elevated from the room temperature to 300° C. at a rate of 20° C./min and then lowered to 80° C. at a rate of 20° C./min. The temperature of the exothermic peak during lowering the temperature was used as the crystallization temperature in a temperature decrease.
(3) Amount of Residual Tetrahydrofuran Pellets of a polybutylene terephthalate resin in an amount of 5 g was dipped into 10 g of water and kept at 120° C. under a pressure for 6 hours. Tetrahydrofuran eluted into water was determined in accordance with the gas chromatography.
(4) Intrinsic Viscosity Using an Ubbelhode viscometer and a mixed solvent composed of phenol and 1,1,2,2-tetrachloroethane in relative amounts by weight of 1/1, viscosity of solutions of a polybutylene terephthalate resin having concentrations of 1.0, 0.6 and 0.3 g/liter were measured at 30° C. and the intrinsic viscosity was obtained by extrapolation of the obtained values to the concentration of zero.

(5) Resistance to Hydrolysis

A dumbbell sample of ASTM No. 1 was treated in a hot and humid condition of saturated steam at 121° C under 203 kPa for 60 hours except that the sample was treated for 100 hours in Examples 3 and 4 and Comparative Examples 3 and 4. The tensile strength was measured before and after the treatment in accordance with the method of ASTM D-638 and the retention of the tensile strength was obtained in accordance with the following equation:

Retention of tensile strength (%)=(tensile strength after treatment/ tensile strength before treatment)×100

(6) Mold-Releasing Property

Using a small type injection molding machine [manufactured by FUNAC Co., Ltd.; FANUC-50B], a thin wall cylindrical molded article having an outer diameter of 10 mm, a length of 30 mm and a thickness at the cylindrical portion of 1 mm was prepared. The mold-releasing property was evaluated based on the easiness of release from the mold and the deformation formed by the pushing pin under the conditions of the lowest filling pressure, a cooling time of 10 seconds and a mold temperature of 80° C. in accordance with the following criteria.

good: released and no deformation found fair: released but deformation found poor: not released (7) Generated Gases Pellets of a polybutylene terephthalate resin or a composition thereof in an amount of 5 g was placed into a glass vial bottle having an inner volume of 26 ml. After the pellets were heated at 150° C. for 2 hours, a sample was taken from the gas phase in the bottle using a microsyringe and analyzed in accordance with the gas chromatography. The total area of peaks in the obtained chromatogram was measured and the amount by weight of tetrahydrofuran was obtained from the area and expressed as ppm by weight based on the amount by weight of the resin.

Example 1

A polybutylene terephthalate resin was prepared using terephthalic acid and 1,4-butanediol as the raw materials in accordance with the continuous polymerization process.

The raw materials were supplied to a slurry preparation tank in relative amounts such that the amount of 1,4-butanediol was 1.8 moles per 1.0 mole of terephthalic acid. A slurry prepared by mixing the raw materials by a stirring apparatus in an amount of 2,976 parts by weight (terephthalic acid: 9.06 parts by mole; 1,4-butanediol: 16.31 parts by mole) was transferred to a first esterification reactor adjusted at a temperature of 230° C. and a pressure of 101 kPa continuously by a gear pump and, at the same time, 3.14 parts by weight of tetrabutyl titanate was supplied. The esterification was conducted for a residence time of 2 hours under stirring and an oligomer was obtained.

The obtained oligomer was continuously transferred to a second esterification reactor adjusted at a temperature of 240° C. and a pressure of 101 kPa and the esterification was further conducted for a residence time of 1 hour under stirring.

The oligomer obtained in the second esterification reactor was continuously transferred to a first polycondensation reactor adjusted at a temperature of 250° C. and a pressure of 6.67 kPa. The polycondensation was conducted for a residence time of 2 hours under stirring and a prepolymer was obtained.

The obtained prepolymer was continuously transferred to a second polycondensation reactor adjusted at a temperature of 250° C. and a pressure of 133 kPa. The polycondensation was further conducted for a residence time of 3 hours under stirring and a polymer was obtained. The obtained polymer was continuously taken out of the second polycondensation reactor, transferred to a die, extruded in the form of strands and cut by a pelletizer and a polybutylene terephthalate resin in the form of pellets was obtained.

The obtained polybutylene terephthalate resin had an amount of carboxyl end group of 20 eq/t, a crystallization temperature in a temperature decrease of 178° C., an amount of residual tetrahydrofuran of 180 ppm by weight and an intrinsic viscosity of 0.85 dl/g.

The tensile strength before the treatment in a hot and humid condition was 56 MPa, the tensile strength after the treatment was 28 MPa and the retention of the tensile strength was 50%. In the test of the mold-releasing property, the molded article could be released and no deformation by the pushing pin was found. The amount of generated gases was 6 ppm by weight as tetrahydrofuran based on the amount by weight of the polybutylene terephthalate resin.

Example 2

In accordance with the same procedures as those conducted in Example 1 except that the residence time in the second polycondensation reactor was 4 hours, pellets of a polybutylene terephthalate was prepared and evaluated.

Comparative Example 1

A polybutylene terephthalate resin was prepared using dimethyl terephthalate and 1,4-butanediol as the raw materials in accordance with the batch polymerization process.

The raw materials in a total amount of 2.976 parts by weight were supplied to a transesterification tank. The relative amounts of the raw materials were such that the amount of 1,4-butanediol was 1.8 moles per 1.0 mole of dimethyl terephthalate. Tetrabutyl titanate in an amount of 3.14 parts by weight was added. The transesterification was conducted at a temperature of 210° C. and a pressure of 101 kPa for 3 hours and an oligomer was obtained.

The obtained oligomer was transferred to a polycondensation reactor. The polycondensation was conducted at a temperature of 250° C. and a pressure of 133 kPa for 3 hours under stirring and a polymer was obtained. The obtained polymer was taken out in the form of strands under a nitrogen pressure and cut by a pelletizer and a polybutylene terephthalate resin in the form of pellets was obtained.

The obtained polybutylene terephthalate resin had an amount of carboxyl end group of 41 eq/t, a crystallization temperature in a temperature decrease of 170° C., an amount of residual tetrahydrofuran of 680 ppm by weight of an intrinsic viscosity of 0.85 dl/g.

The tensile strength before the treatment in a hot and humid condition was 55 MPa, the tensile strength after the treatment was 10 MPa and the retention of the tensile strength was 18%. In the test of the mold-releasing property, the molded article could not be released. The amount of generated gases was 20 ppm by weight as tetrahydrofuran based on the amount by weight of the polybutylene terephthalate resin.

Comparative Example 2

Pellets of a polybutylene terephthalate were prepared and evaluated in accordance with the same procedures as those conducted in Comparative Example 1 except that the polycondensation time in the polycondensation reactor was 4 hours.

The results of Examples 1 and 2 and Comparative Examples 1 and 2 are shown in Table 1.

TABLE 1

|  | Example | | Comparative Example | |
| --- | --- | --- | --- | --- |
|  | 1 | 2 | 1 | 2 |
| Polymerization | | | | |
| process | continuous | continuous | batch | batch |
| dicarboxylic acid component | TPA | TPA | DMT | DMT |
| time of second polycondensation (h) | 3 | 4 | 3 | 4 |
| Polybutylene terephthalate | | | | |
| intrinsic viscosity (dl/g) | 0.85 | 0.95 | 0.85 | 0.95 |
| amount of carboxyl end group (eq/t) | 20 | 25 | 41 | 50 |
| crystallization temperature in temperature decrease (° C.) | 178 | 176 | 170 | 168 |
| amount of residual tetrahydrofuran (ppm) | 180 | 200 | 680 | 790 |
| Evaluation of resin | | | | |
| tensile strength before treatment under heating and oxidation (MPa) | 56 | 54 | 55 | 53 |
| tensile strength after treatment under heating and oxidation (MPa) | 28 | 33 | 10 | 11 |
| retention of tensile strength (%) | 50 | 61 | 18 | 20 |
| mold-releasing property | good | good | poor | poor |
| amount of generated gases (ppm) | 6 | 7 | 20 | 25 |

Notes:
TPA: terephthalic acid
DMT: dimethyl terephthalate

As shown in Table 1, the polybutylene terephthalate resins of Examples 1 and 2 which were obtained by the continuous polycondensation of terephthalic acid and 1,4-butanediol had smaller amounts of carboxyl end group, higher crystallization temperatures in a temperature decrease and smaller amounts of residual tetrahydrofuran than those in the polybutylene terephthalate of Comparative Examples 1 and 2 which were obtained by the batch polycondensation. The dumbbell samples of Examples 1 and 2 and the dumbbell samples of Comparative Examples 1 and 2 had about the same tensile strength before the treatment in the hot and humid condition. The dumbbell samples of Examples 1 and 2 showed retentions of the tensile strength of 50% or greater after the treatment in the hot and humid condition of 121° C. for 60 hours. In contrast, the retentions of the tensile strength of the dumbbell samples of Comparative Examples 1 and 2 decreased after the treatment in the hot and humid condition to about 20%. Therefore, it is shown that the polybutylene terephthalate resin of the present invention had excellent resistance to hydrolysis. The thin wall cylindrical molded articles prepared from the polybutylene terephthalate resins of Comparative Examples 1 and 2 could not be released from the mold after cooling for 10 seconds. In contrast, the similar molded articles prepared from the polybutylene terephthalate resins of Examples 1 and 2 could be released from the mold without deformation by the pushing pin under the same condition and the molding cycle in injection molding could be reduced. The amounts of gases generated from the polybutylene terephthalate resins of Examples 1 and 2 by heating at 150° C. for 2 hours was about ⅓ of the amounts of gases generated from the polybutylene terephthalate resins of Comparative Example 1 and 2. It is estimated that the polybutylene terephthalate resins of Examples 1 and 2 had little possibility of causing corrosion of electric contacts due to generation of gases when the resins were used for members of electric and electronic products.

Example 3

To 100 parts by weight of pellets of the polybutylene terephthalate resin prepared in Example 1, 43 parts by weight of glass fiber [manufactured by NIPPON ELECTRIC GLASS Co., Ltd.; T-123; the average diameter of fiber: 13 μm; the average length of fiber: 3 mm] was added. The obtained mixture was mixed in the melted condition at 260° C. using a twin-screw extruder having vents and screws having a diameter of 30 cm [manufactured by NIPPON SEIKOSHO Co., Ltd.; TEX30C], extruded in the form of strands and formed into pellets and pellets of a polybutylene terephthalate resin composition reinforced with glass fiber were obtained.

Using the obtained polybutylene terephthalate composition obtained above, the resistance to hydrolysis, the mold-releasing property and the amount of generated gases were measured. The tensile strength before the treatment in a hot and humid condition was 135 MPa, the tensile strength after the treatment was 95 MPa and the retention of the tensile strength was 70%. In the test of the mold-releasing property, the molded article could be released and no deformation by the pushing pin was found. The amount of generated gases was 4 ppm by weight as tetrahydrofuran based on the amount by weight of the polybutylene terephthalate resin.

Example 4

Pellets of a polybutylene terephthalate resin composition reinforced with glass fiber were prepared and evaluated in accordance with the same procedures as those conducted in Example 3 except that 18 parts by weight of glass fiber [manufactured by NIPPON ELECTRIC GLASS Co., Ltd.; T-123] was added to 100 parts by weight of pellets of the polybutylene terephthalate resin obtained in Example 2.

Comparative Example 3

Pellets of a polybutylene terephthalate resin composition reinforced with glass fiber were prepared and evaluated in accordance with the same procedures as those conducted in Example 3 except that 43 parts by weight of glass fiber [manufactured by NIPPON ELECTRIC GLASS Co., Ltd.; T-123] was added to 100 parts by weight of pellets of the polybutylene terephthalate resin obtained in Comparative Example 1.

Comparative Example 4 pellets of a polybutylene terephthalate resin composition reinforced with glass fiber were prepared and evaluated in accordance with the same procedures as those conducted in Comparative Example 3 except that 18 parts by weight of glass fiber [manufactured by NIPPON ELECTRIC GLASS Co., Ltd.; T-123] was added to 100 parts by weight of pellets of the polybutylene terephthalate resin obtained in Comparative Example 2.

The results of Example 3 and 4 and Comparative Examples 3 and 4 are shown in Table 2.

TABLE 2

|  | Example | | Comparative Example | |
|---|---|---|---|---|
|  | 3 | 4 | 3 | 4 |
| Polymerization | | | | |
| process | continuous | continuous | batch | batch |
| dicarboxylic acid component | TPA | TPA | DMT | DMT |
| time of second polycondensation (h) | 3 | 4 | 3 | 4 |
| Polybutylene terephthalate | | | | |
| inherent viscosity (dl/g) | 0.85 | 0.95 | 0.85 | 0.95 |
| amount of carboxyl end group (eq/t) | 20 | 25 | 41 | 50 |
| crystallization temperature in temperature decrease (° C.) | 178 | 176 | 170 | 168 |
| amount of residual tetrahydrofuran (ppm) | 180 | 200 | 680 | 790 |
| Formulation of composition | | | | |
| polybutylene terephthalate (part by weight) | 100 | 100 | 100 | 100 |
| glass fiber (part by weight) | 43 | 18 | 43 | 18 |
| Evaluation of resin | | | | |
| tensile strength before treatment under heating and oxidation (MPa) | 135 | 95 | 136 | 93 |
| tensile strength after treatment under heating and oxidation (MPa) | 95 | 49 | 52 | 30 |
| retention of tensile strength (%) | 70 | 52 | 38 | 32 |
| mold-releasing property | good | good | fair | fair |
| amount of generated gases (ppm) | 4 | 5 | 15 | 18 |

Notes:
TPA: terephthalic acid
DMT: dimethyl terephthalate

As shown in Table 2, the polybutylene terephthalate resins of Examples 3 and 4 which were obtained by the continuous polycondensation of terephthalic acid and 1,4-butanediol had smaller amounts of carboxyl end group, higher crystallization temperatures in a temperature decrease and smaller amounts of residual tetrahydrofuran than those in the polybutylene terephthalate of Comparative Examples 3 and 4 which were obtained by the batch polycondensation. The dumbbell sample of Example 3 and the dumbbell sample of Comparative Example 3 which were obtained by adding glass fiber to respective polybutylene terephthalate resins had about the same tensile strength before the treatment in the hot and humid condition. The dumbbell sample of Example 4 and the dumbbell sample of Comparative Example 4 which were obtained by adding glass fiber to respective polybutylene terephthalate resins had about the same tensile strength before the treatment in the hot and humid condition. The dumbbell samples of Examples 3 and 4 showed retentions of the tensile strength of 50 to 70% after the treatment in the hot and humid condition of 121° C. for 100 hours. In contrast, the retentions of the tensile strength of the dumbbell samples of Comparative Examples 3 and 4 decreased to 40% or smaller after the treatment in the hot and humid condition. Therefore, it is shown that the polybutylene terephthalate resin of the present invention had excellent resistance to hydrolysis. The thin wall cylindrical molded articles prepared from the polybutylene terephthalate resins of Comparative Examples 3 and 4 had deformation by the pushing pin when the cooling time was 10 seconds. In contrast, the similar molded articles prepared from the polybutylene terephthalate resins of Examples 3 and 4 could be released from the mold without deformation by the pushing pin under the same condition and the molding cycle in injection molding could be reduced. The amounts of gases generated from the polybutylene terephthalate resins of Examples 3 and 4 by heating at 150° C. for 2 hours were about ¼ of the amounts generated from the polybutylene terephthalate resins of Comparative Example 3 and 4. It is estimated that the polybutylene terephthalate resins of Examples 3 and 4 had little possibility of causing corrosion of electric contacts due to generation of gases when the resins were used for members of electric and electronic products.

In Examples 5 to 9 and Comparative Examples 5 to 11 shown in the following, the resistance to heat aging was evaluated in accordance with the following method.

(8) Resistance to heat aging

A dumbbell sample of ASTM No. 1 was prepared from a polybutylene terephthalate resin composition by injection molding and treated in an oven circulating heated air at 150° C. for 250 hours or 500 hours. The b-value of color tone, the tensile strength and the elongation at break were measured before and after the treatment. The b-value of color tone was measured by using a multi-light source spectrophotometric colorimeter [manufactured by SUGA SHIKENKI Co., Ltd.; Model MSC-5N]. The tensile strength and the elongation at break were measured in accordance with the method of ASTM D-638.

Example 5

To 99.7 parts by weight of the pellets of the polybutylene terephthalate resin prepared in Example 2, 0.1 part by weight of pentaerythritol tetrakis[3-(3,5-di-t-butyl-4-hydroxyphenyl) propionate] [manufactured by CIBA GEIGY Company; IRGANOX 1010] and 0.2 parts by weight of pentaerythritol tetrakis(3-dodecyl thiopropionate) [manufactured by SHIPURO KASEI Co., Ltd.; SEENOX 412S] were added. The obtained mixture was mixed in the melted condition at 260° C. using a twin-screw extruder having vents and screws having a diameter of 30 cm [manufactured by NIPPON SEIKOSHO Co., Ltd.; TEX30C], extruded in the form of strands and formed into pellets.

A dumbbell sample of ASTM No. 1 was prepared from the obtained pellets by injection molding. The b-value of color tone was 2.1, the tensile strength was 52 MPa and the elongation at break was 50%.

Then, to evaluate the resistance to heat aging, the dumbbell sample was treated in an oven circulating heat air at 150° C. for 250 hours or 500 hours. The b-value of color tone, the tensile strength and the elongation at break were measured after the treatment. The dumbbell sample treated for 250 hours had a b-value of color tone of 6.1, a tensile strength of 60 MPa and an elongation at break of 20% and the dumbbell sample treated for 500 hours had a b-value of color tone of 9.1, a tensile strength of 58 MPa and an elongation at break of 15%.

Example 6

Pellets of a polybutylene terephthalate resin were prepared and evaluated in accordance with the same procedures as those conducted in Example 1 except that the residence time in the second polycondensation reactor was 5 hours.

To the pellets of the polybutylene terephthalate resin, the antioxidants were added in the same manner as that in

Example 5 and the obtained mixture was mixed in the melted condition. Pellets were obtained from the resultant mixture and evaluated.

Example 7

Pellets were obtained and evaluated in accordance with the same procedures as those conducted in Example 5 except that bis(2,6-di-t-butyl-4-methylphenyl)pentaerythritol diphosphite [manufactured by ASAHI DENKA KOGYO Co., Ltd.; ADEKASTAB PEP 36] was added in place of pentaerythritol tetrakis(3-dodecyl thiopropionate).

Example 8

Pellets were obtained and evaluated in accordance with the same procedures as those conducted in Example 6 except that bis(2,6-di-t-butyl-4-methylphenyl)pentaerythritol diphosphite was added in place of pentaerythritol tetrakis (3-dodecyl thiopropionate).

Example 9

Pellets were obtained and evaluated in accordance with the same procedures as those conducted in Example 5 except that 0.3 parts by weight of pentaerythritol tetrakis[3-(3,5-di-t-butyl-4-hydroxyphenyl) propionate] was added in place of 0.1 part by weight of pentaerythritol tetrakis[3-(3,5-di-t-butyl-4-hydroxyphenyl) propionate] and 0.2 parts by weight of pentaerythritol tetrakis(3-dodecyl thiopropionate).

Comparative Example 5

To the pellets of the polybutylene terephthalate resin obtained in Comparative Example 2, the antioxidants were added in the same manner as that in Example 5 and the obtained mixture was mixed in the melted condition to obtain pellets. A dumbbell sample of ASTM No. 1 was prepared from the obtained pellets by injection molding and the resistance to heat aging and the resistance to hydrolysis were evaluated.

Comparative Example 6

Pellets of a polybutylene terephthalate resin were prepared in accordance with the same procedures as those conducted in Comparative Example 2 except that the time of the polycondensation in the polycondensation reactor was 5 hours.

The obtained polybutylene terephthalate resin had 55 eg/t of carboxyl end group, a crystallization temperature in a temperature decrease of 167° C., an amount of residual tetrahydrofuran of 750 ppm by weigh of an intrinsic viscosity of 1.04 dl/g.

To the pellets of the polybutylene terephthalate resin obtained above, the antioxidants were added in the same manner as that in Example 5. The obtained mixture was mixed in the melted condition to obtain pellets and the obtained pellets were evaluated.

Comparative Example 7

Pellets were obtained and evaluated in accordance with the same procedures as those conducted in Example 7 except that the polybutylene terephthalate resin obtained in Comparative Example 2 was used.

Comparative Example 8

Pellets were obtained and evaluated in accordance with the same procedures as those conducted in Example 8 except that the polybutylene terephthalate resin obtained in Comparative Example 6 was used.

Comparative Example 9

Pellets were obtained and evaluated in accordance with the same procedures as those conducted in Example 9 except that the polybutylene terephthalate resin obtained in Comparative Example 2 was used.

Comparative Example 10

The polybutylene terephthalate resin in the form of pellets which was obtained in Example 2 was mixed in the melted condition using a twin extruder having vents under the same condition as that in Example 5 without adding antioxidants and extruded in the form of strands and pellets were obtained. A dumbbell sample was prepared from the pellets by injection molding and evaluated.

Comparative Example 11

The polybutylene terephthalate resin in the form of pellets which was obtained in Comparative Example 2 was mixed in the melted condition using a twin extruder having vents under the same condition as that in Example 5 without adding antioxidants and extruded in the form of strands and pellets were obtained. A dumbbell sample was prepared from the pellets by injection molding and evaluated.

The physical properties of the polybutylene terephthalate resins and the formulations for the resin compositions of Examples 5 to 9 are shown in Table 3. The results of evaluation of the compositions of Examples 5 to 9 are shown in Table 4. The physical properties of the polybutylene terephthalate resins and the formulations for the resin compositions of Comparative Examples 5 to 11 are shown in Table 5. The results of evaluation of the compositions of Comparative Examples 5 to 11 are shown in Table 6.

TABLE 3

| Example | 5 | 6 | 7 | 8 | 9 |
|---|---|---|---|---|---|
| Polymerization | | | | | |
| process | cont | cont | cont | cont | cont |
| dicarboxylic acid component | TPA | TPA | TPA | TPA | TPA |
| time of second polycondensation (h) | 4 | 5 | 4 | 5 | 4 |
| Polybutylene terephthalate | | | | | |
| amount of carboxyl end group (eq/t) | 25 | 28 | 25 | 28 | 25 |
| crystallization temperature in temperature decrease (° C.) | 176 | 175 | 176 | 175 | 176 |
| amount of residual tetrahydrofuran (ppm) | 200 | 180 | 200 | 180 | 200 |
| intrinsic viscosity (dl/g) | 0.95 | 1.05 | 0.95 | 1.05 | 0.95 |
| Formulation of composition | | | | | |
| polybutylene terephthalate | 99.7 | 99.7 | 99.7 | 99.7 | 99.7 |
| IRGANOX 1010 | 0.1 | 0.1 | 0.1 | 0.1 | 0.3 |
| SEENOX 412S | 0.2 | 0.2 | — | — | — |
| PEP 36 | — | — | 0.2 | 0.2 | — |

Notes:
cont: continuous
TPA: terephthalic acid
IRGANOX 1010: pentaerythritol tetrakis[3-(3,5-di-t-butyl-4-hydroxyphenyl) propionate]
SEENOX: pentaerythritol tetrakis(3-dodecyl thiopropionate)
PEP 36: bis(2,6-di-t-butyl-4-methylphenyl)pentaerythritol diphosphite

TABLE 4

| Example | 5 | 6 | 7 | 8 | 9 |
|---|---|---|---|---|---|
| Resistance to heat aging b-value of color tone | | | | | |
| before treatment | 2.1 | 2.3 | 1.8 | 2.0 | 2.1 |
| after 250 hours | 6.1 | 6.4 | 5.5 | 5.7 | 6.3 |
| | (4.0) | (4.1) | (3.7) | (3.7) | (4.2) |
| after 500 hours | 9.1 | 9.0 | 8.3 | 8.4 | 9.3 |
| | (7.0) | (6.7) | (6.5) | (6.4) | (7.2) |
| tensile strength (MPa) | | | | | |
| before treatment | 52 | 50 | 51 | 51 | 52 |
| after 250 hours | 60 | 59 | 61 | 58 | 61 |
| | (8) | (9) | (10) | (7) | (9) |
| after 500 hours | 58 | 60 | 60 | 59 | 57 |
| | (6) | (10) | (9) | (8) | (5) |
| elongation at break (%) | | | | | |
| before treatment | 50 | 180 | 50 | 160 | 51 |
| after 250 hours | 20 | 40 | 18 | 38 | 21 |
| after 500 hours | 15 | 23 | 12 | 21 | 16 |
| Resistance to hydrolysis tensile strength (MPa) | | | | | |
| before treatment in hot and humid condition | 54 | 53 | 53 | 52 | 52 |
| after treatment in hot and humid condition | 34 | 40 | 28 | 33 | 33 |
| retention of tensile strength (%) | 63 | 75 | 53 | 63 | 63 |

Note:
Values in the parentheses show differences from the values before the treatment.

TABLE 5

| Comparative Example | 5 | 6 | 7 | 8 | 9 | 10 | 11 |
|---|---|---|---|---|---|---|---|
| Polymerization | | | | | | | |
| process | batch | batch | batch | batch | batch | batch | batch |
| dicarboxylic acid component | DMT | DMT | DMT | DMT | DMT | DMT | DMT |
| time of second polycondensation (h) | 4 | 5 | 4 | 5 | 4 | 4 | 4 |
| Polybutylene terephthalate | | | | | | | |
| amount of carboxyl end group (eq/t) | 50 | 55 | 50 | 55 | 50 | 25 | 50 |
| crystallization temperature in temperature decrease (° C.) | 168 | 167 | 168 | 167 | 168 | 176 | 168 |
| amount of residual tetrahydrofuran (ppm) | 790 | 750 | 790 | 750 | 790 | 200 | 790 |
| Intrinsic viscosity (dl/g) | 0.96 | 1.04 | 0.96 | 1.04 | 0.96 | 0.95 | 0.96 |
| Formulation of composition | | | | | | | |
| polybutylene terephthalate | 99.7 | 99.7 | 99.7 | 99.7 | 99.7 | 100 | 100 |
| IRGANOX 1010 | 0.1 | 0.1 | 0.1 | 0.1 | 0.3 | — | — |
| SEENOX 412S | 0.2 | 0.2 | — | — | — | — | — |
| EP 36 | — | — | 0.2 | 0.2 | — | — | — |

Notes:
DMT: dimethyl terephthalate
IRGANOX 1010: pentaerythritol tetrakis[3-(3,5-di-t-butyl-4-hydroxyphenyl) propionate]
SEENOX: pentaerythritol tetrakis(3-dodecyl thiopropionate)
PEP 36: bis(2,6-di-t-butyl-4-methylphenyl)pentaerythritol diphosphite

TABLE 6

| Comparative Example | 5 | 6 | 7 | 8 | 9 | 10 | 11 |
|---|---|---|---|---|---|---|---|
| Resistance to heat aging b-value of color tone | | | | | | | |
| before treatment | 2.3 | 2.5 | 2.0 | 2.3 | 2.4 | 2.5 | 2.6 |
| after 250 hours | 7.2 | 7.3 | 6.7 | 6.9 | 7.4 | 7.1 | 8.1 |
| | (4.9) | (4.8) | (4.7) | (4.6) | (5.0) | (4.6) | (5.5) |
| after 500 hours | 10.6 | 10.9 | 10.0 | 10.3 | 10.8 | 10.7 | 13.1 |
| | (8.3) | (8.4) | (8.0) | (8.0) | (8.4) | (8.2) | (10.5) |

TABLE 6-continued

| Comparative Example | 5 | 6 | 7 | 8 | 9 | 10 | 11 |
|---|---|---|---|---|---|---|---|
| tensile strength (MPa) | | | | | | | |
| before treatment | 52 | 49 | 52 | 50 | 51 | 52 | 51 |
| after 250 hours | 61 | 59 | 60 | 60 | 60 | 60 | 61 |
| | (9) | (10) | (8) | (10) | (9) | (8) | (10) |
| after 500 hours | 50 | 60 | 48 | 59 | 50 | 57 | 56 |
| | (−2) | (11) | (−4) | (9) | (−1) | (5) | (5) |
| elongation at break (%) | | | | | | | |
| before treatment | 45 | 170 | 40 | 165 | 43 | 50 | 48 |
| after 250 hours | 12 | 20 | 10 | 12 | 11 | 15 | 8 |
| after 500 hours | 9 | 13 | 8 | 10 | 8 | 9 | 5 |
| Resistance to hydrolysis tensile strength (MPa) | | | | | | | |
| before treatment in hot and humid condition | 53 | 52 | 52 | 51 | 52 | 54 | 53 |
| after treatment in hot and humid condition | 12 | 20 | 8 | 15 | 11 | 33 | 11 |
| retention of tensile strength (%) | 23 | 38 | 15 | 29 | 21 | 61 | 20 |

Note:
Values in the parentheses show differences from the values before the treatment.

The polybutylene terephthalate resins of Examples 5 and 6 which were obtained by the continuous polycondensation of terephthalic acid and 1,4-butanediol had smaller amounts of carboxyl end group, higher crystallization temperatures in a temperature decrease and smaller amounts of residual tetrahydrofuran than those in the polybutylene terephthalates of Comparative Examples 5 and 6 which were obtained by the batch polycondensation. The dumbbell samples of Examples 5, 7 and 9 and the dumbbell samples of Comparative Examples 5, 7 and 9 which were obtained by adding antioxidants to the corresponding polybutylene terephthalate resins had about the same b-value of color tone, tensile strength and elongation before the heat treatment. The dumbbell samples of Examples 6 and 8 and the dumbbell samples of Comparative Examples 6 and 8 which were obtained by adding antioxidants to the corresponding polybutylene terephthalate resins had about the same b-value of color tone, tensile strength and elongation before the heat treatment. The dumbbell samples of Examples 5 to 9 showed the b-values of color tone of 8.3 to 9.3 and elongations at break of 12 to 23% after the heat treatment for 500 hours. In contrast, in the dumbbell samples of Comparative Examples 5 to 9, the b-value of color tone increased to 10.0 to 10.9 and the elongation at break decreased to 8 to 13% after the heat treatment for 500 hours.

When the tensile strengths of the resin compositions of Examples 5, 7 and 9 are compared with those of Comparative Examples 5, 7 and 9, the tensile strength increased in all cases after the heat treatment for 250 hours due to increases in the crystallization. In Examples 5, 7 and 9, the tensile strength after the heat treatment for 500 hours remained about the same as that after the heat treatment for 250 hours. In contrast, in Comparative Examples 5, 7 and 9, the tensile strength after the heat treatment for 500 hours decreased by about 10 MPa from that after the heat treatment for 250 hours. In the test of resistance to hydrolysis, the retention of the tensile strength of the resin compositions of Examples 5 to 9 was 53 to 75%. In contrast, the retention of the tensile strength of the resin compositions of Comparative Examples 5 to 9 was 15 to 38%.

It is shown by the above results that the polybutylene terephthalate resin compositions of the present invention exhibited excellent stability under heating and oxidation (excellent resistance to heat aging) and excellent resistance to hydrolysis.

In Examples 10 to 12 and Comparative Example 12 to 18 shown in the following, the mold-releasing property was evaluated in accordance with method (9) described in the following. The other evaluations were conducted in accordance with methods (1) to (8) described above.

(9) Mold-releasing property

Using a polybutylene terephthalate resin composition, connectors having 16 connecting portions were prepared continuously by using an injection molding machine [manufactured by NIPPON SEIKOSHO Co., Ltd.; SG-75]. The shortest cooling time which could achieve molding of successive 20 shots without leaving any molded products in the fixed mold was obtained. The cylinder temperature was set at 250° C. and the initial mold temperature was set at 45° C.

Example 10

To 99.7 parts by weight of the polybutylene terephthalate resin prepared in Example 1, 0.3 parts by weight of an ester of montanic acid [manufactured by TOYO PETROLITE Co., Ltd.; RUZAWAX EP] was added and mixed in the melted condition at 260° C. using a twin-screw extruder having screws having a diameter of 30 cm [manufactured by NIPPON SEIKOSHO Co., Ltd.; TEX30C], extruded in the form of strands and formed into pellets and pellets of a polybutylene terephthalate resin composition were obtained.

For evaluation of the mold-releasing property, connectors having 16 connecting portions were prepared continuously by injection molding and the shortest cooling time was obtained. The continuous molding could be conducted when the cooling time was 12 seconds. When the cooling time was 11 seconds, the molded product was left in the fixed mold and the mold-releasing became poor.

Example 11

Pellets of a polybutylene terephthalate resin composition were prepared and the mold-releasing property was evaluated in accordance with the same procedures as those conducted in Example 10 except that pentaerythritol tetrastearate [manufactured by NIPPON OIL & FAT Co., Ltd.; H-476] was added in place of the ester of montanic acid.

Example 12

Pellets of the polybutylene terephthalate resin composition were prepared by adding the ester of montanic acid to the polyethylene terephthalate resin prepared in Example 2 and the mold-releasing property was evaluated in accordance with the same procedures as those conducted in Example 10.

Comparative Example 12

To 99.7 parts by weight of the polybutylene terephthalate resin prepared in Comparative Example 1, 0.3 parts by weight of the same ester of montanic acid as that used in Example 10 was added and mixed in the melted condition. The resultant mixture was extruded in the form of pellets and pellets of a polybutylene terephthalate resin composition were obtained.

For evaluation of the mold-releasing property, the shortest cooling time was obtained in accordance with the same method as that in Example 10. The continuous molding could be conducted when the cooling time was 18 seconds. When the cooling time was 17 seconds, the molded product was left in the fixed mold and the mold-releasing became poor.

Comparative Example 13

Pellets of a polybutylene terephthalate resin composition were prepared and the mold-releasing property was evaluated in accordance with the same procedures as those conducted in Comparative Example 12 except that pentaerythritol tetrastearate [manufactured by NIPPON OIL & FAT Co., Ltd.; H-476] was added in place of the ester of montanic acid.

Comparative Example 14

Pellets of the polybutylene terephthalate resin composition were prepared by adding the ester of montanic acid to the polyethylene terephthalate resin prepared in Comparative Example 2 and the mold-releasing property was evaluated in accordance with the same procedures as those conducted in Comparative Example 12.

Comparative Example 15

Pellets of a polybutylene terephthalate resin composition were prepared and the mold-releasing property was evaluated in accordance with the same procedures as those conducted in Example 10 except that a polyethylene wax [manufactured by MITSUI CHEMICALS, INC.; HIWAX 100P] was added in place of the ester of montanic acid.

Comparative Example 16

Pellets of a polybutylene terephthalate resin composition were prepared and the mold-releasing property was evaluated in accordance with the same procedures as those conducted in Comparative Example 12 except that a polyethylene wax [manufactured by MITSUI CHEMICALS, INC.; HIWAX 100P] was added in place of the ester of montanic acid.

Comparative Example 17

Connectors having 16 connecting portions were prepared by injection molding from the polybutylene terephthalate resin prepared in Example 1 without adding mold-releasing agents and the mold-releasing property was evaluated.

Comparative Example 18

Connectors having 16 connecting portions were prepared by injection molding from the polybutylene terephthalate resin prepared in Comparative Example 1 without adding mold-releasing agents and the mold-releasing property was evaluated.

The results of Examples 10 to 12 and Comparative Example 12 to 18 are shown in Table 7.

TABLE 7

|  | Example | | | Comparative Example | | | | | | |
| --- | --- | --- | --- | --- | --- | --- | --- | --- | --- | --- |
|  | 10 | 11 | 12 | 12 | 13 | 14 | 15 | 16 | 17 | 18 |
| Polymerization | | | | | | | | | | |
| process | cont | cont | cont | batch | batch | batch | cont | batch | cont | batch |
| dicarboxylic acid component TPA | TPA | TPA | TPA | DMT | DMT | DMT | TPA | DMT | TPA | DMT |
| time of second polycondensation (h) | 3 | 3 | 4 | 3 | 3 | 4 | 3 | 3 | 3 | 3 |
| Polybutylene terephthalate | | | | | | | | | | |
| intrinsic viscosity (dl/g) | 0.85 | 0.85 | 0.95 | 0.85 | 0.85 | 0.95 | 0.85 | 0.85 | 0.85 | 0.85 |
| amount of carboxyl end group (eq/t) | 20 | 20 | 25 | 41 | 41 | 50 | 20 | 41 | 20 | 41 |
| crystallization temperature in temperature decrease (° C.) | 178 | 178 | 176 | 170 | 170 | 168 | 178 | 170 | 178 | 170 |
| amount of residual tetrahydrofuran (ppm) | 180 | 180 | 200 | 680 | 680 | 790 | 180 | 680 | 180 | 680 |
| Formulation of composition | | | | | | | | | | |
| polybutylene terephthalate | 99.7 | 99.7 | 99.7 | 99.7 | 99.7 | 99.7 | 99.7 | 99.7 | 100 | 100 |
| ester of montanic acid | 0.3 | — | 0.3 | 0.3 | — | 0.3 | — | — | — | — |
| pentaerythritol tetrastearate | — | 0.3 | — | — | 0.3 | — | — | — | — | — |

TABLE 7-continued

|  | Example | | | Comparative Example | | | | | | |
| --- | --- | --- | --- | --- | --- | --- | --- | --- | --- | --- |
|  | 10 | 11 | 12 | 12 | 13 | 14 | 15 | 16 | 17 | 18 |
| polyethylene wax | — | — | — | — | — | — | 0.3 | 0.3 | — | — |
| Mold-releasing property | | | | | | | | | | |
| shortest cooling time (s) | 12 | 13 | 13 | 18 | 20 | 19 | 22 | 24 | 28 | 30 |

Notes:
cont: continuous
TPA: terephthalic acid
DMT: dimethyl terephthalate

As shown in Table 7, the polybutylene terephthalate resins which were obtained by the continuous polycondensation of terephthalic acid and 1,4-butanediol had smaller amounts of carboxyl end group, higher crystallization temperatures in a temperature decrease and smaller amounts of residual tetrahydrofuran than those in the polybutylene terephthalates which were obtained by the batch polycondensation of terephthalic acid and 1,4-butanediol. In Examples 10 to 12 in which the ester of montanic acid or pentaerythritol tetrastearate was added as the mold-releasing agent to the polybutylene terephthalate resin prepared by the continuous polycondensation of terephthalic acid and 1,4-butanediol, the shortest cooling time decreased to a great degree. This means a remarkable improvement in the mold-releasing property.

On the other hand, as shown in Comparative Examples 12 to 14, the polybutylene terephthalate which was prepared by the batch polycondensation of terephthalic acid and 1,4-butanediol could not achieve remarkable improvement in the mold-releasing property even when the ester of montanic acid or pentaerythritol tetrastearate was added as the mold-releasing agent. Even when the polybutylene terephthalate resin prepared by the continuous polycondensation of terephthalic acid and 1,4-butanediol is used, as shown in Comparative Example 15 in which the polyethylene wax was used as the mold-releasing agent, the degree of improvement in the mold-releasing property obtained by adding the polyethylene wax was about the same as that obtained by adding the polyethylene wax as the mold-releasing agent to the polybutylene terephthalate which was obtained by the batch polycondensation of terephthalic acid and 1,4-butanediol.

It is shown by the above results that the specific effect was exhibited and the mold-releasing property was remarkably improved by the combination of the polybutylene terephthalate which was obtained by the continuous polycondensation of terephthalic acid and 1,4-butanediol and has a small amount of carboxyl end group, a high crystallization temperature in a temperature decrease and a small amount of residual tetrahydrofuran, with the fatty acid ester as the mold-releasing agent.

What is claimed is:

1. A polybutylene terephthalate resin which is produced by continuous polycondensation using terephthalic acid and 1,4-butanediol as main raw materials and has 30 eq/t or less of a carboxyl end group, a crystallization temperature in a temperature decrease of 175° C. or higher as measured by a differential scanning calorimeter at a rate of the temperature decrease of 20° C./min and an amount of residual tetrahydrofuran of 300 ppm by weight or less in the polybutylene terephthalate resin.

2. The resin according to claim 1, wherein the amount of residual tetrahydrofuran is 50 to 300 ppm by weight in the polybutylene terephthalate resin.

3. The resin according to claim 1, wherein the polybutylenetere phthalate resin further has an intrinsic viscosity of 0.5 to 1.5 dl/g as measured at 30° C. in a mixed solvent of phenol and 1,1,2,2-tetrachloroethane in amounts by weight of 1/1.

4. A polybutylene terephthalate resin composition which comprises the polybutylene terephthalate resin according to claim 1 and a glass fiber.

5. The composition according to claim 4, wherein the amount of residual tetrahydrofuran is 50 to 300 ppm in the polybutylene terephthalate resin.

6. The composition according to claim 4, wherein the polybutylene terephthalate resin further has an intrinsic viscosity of 0.5 to 1.5 dl/g as measured at 30° C. in a mixed solvent of phenol and 1,1,2,2-tetrachloroethane in amounts by weight of 1/1.

7. The composition according to claim 4, wherein the glass fiber is comprised in an amount of 3 to 150 parts by weight per 100 parts by weight of the polybutylene terephthalate resin.

8. A polybutylene terephthalate resin composition which comprises the polybutylene terephthalate resin according to claim 1 and a phenolic antioxidant.

9. The composition according to claim 8, which further comprises at least one antioxidant selected from a group consisting of a sulfur-based antioxidant and a phosphorus-based antioxidant.

10. The composition according to claim 8, wherein the phenolic antioxidant is a hindered phenolic antioxidant.

11. The composition according to claim 9, wherein the sulfur-based antioxidant is a thioether-based antioxidant.

12. The composition according to claim 8, wherein the amount of residual tetrahydrofuran is 50 to 300 ppm by weight in the polybutylene terephthalate resin.

13. The composition according to claim 8, wherein the polybutylene terephthalate resin further has an intrinsic viscosity of 0.5 to 1.5 dl/g as measured at 30° C. in a mixed solvent composed of phenol and 1,1,2,2-tetrachloroethene in relative amounts by weight of 1/1.

14. The composition according to claim 8, wherein the phenolic antioxidant is comprised in an amount of 0.001 to 2 parts by weight per 100 parts by weight of the polybutylene terephthalate resin.

15. A polybutylene terephthalate resin composition which comprises the polybutylene terephthalate resin according to claim 1 and a fatty acid ester which has a residue group of a fatty acid having 12 to 36 carbon atoms and a residue group of an alcohol having 1 to 36 carbon atoms.

16. The composition according to claim 15, wherein the amount of residual tetrahydrofuran is 50 to 300 ppm by weight in the polybutylene terephthalate resin.

17. The composition according to claim 15, wherein the polybutylene terephthalate resin further has an intrinsic viscosity of 0.5 to 1.5 dl/g as measured at 30° C. in a mixed solvent of phenol and 1,1,2,2-tetrachloroethane in relative amounts by weight of 1/1.

18. The composition according to claim 15, wherein the fatty acid ester is comprised in an amount of 0.01 to 2 parts by weight per 100 parts by weight of the polybutylene terephthalate resin.

19. A molded article obtained by molding the polybutylene terephthalate resin described in claim 1.

20. The polybutylene terephthalate resin according to claim 1, wherein the continuous polycondensation process is conducted in a plurality of tank reactors which are connected to each other in series.

21. The polybutylene terephthalate resin composition according to claim 4, wherein the continuous polycondensation process is conducted in a plurality of tank reactors which are connected to each other in series.

22. The polybutylene terephthalate resin composition according to claim 8, wherein the continuous polycondensation process is conducted in a plurality of tank reactors which are connected to each other in series.

23. The polybutylene terephthalate resin composition according to claim 15, wherein the continuous polycondensation process is conducted in a plurality of tank reactors which are connected to each other in series.

24. The composition according to claim 1, wherein the carboxyl end group is in a content of 25 eq/t or less.

25. The composition according to claim 24, wherein the temperature decrease is 177° C. or higher.

26. The composition according to claim 25, wherein the amount of the residual tetrahydrofuran in the polybutylene terephthalate resin is 200 ppm by weight or less.

27. The composition according to claim 3, wherein the intrinsic viscosity is 0.6 to 1.3 dl/g.

28. The composition according to claim 3, wherein the intrinsic viscosity is 0.7 to 1.5 dl/g.

29. The composition according to claim 7, wherein the glass fibers have an average diameter of 1 to 100 $\mu$m and an average length of 0.1 to 20 mm.

30. The composition according to claim 7, wherein the glass fibers have an average diameter of 2 to 50 $\mu$m and an average length of 1 to 10 mm.

31. The composition according to claim 9, wherein the phenolic antioxidant is in an amount of 0.001 to 2 parts by weight per 100 parts by weight of the polybutylene terephthalate resin.

32. The composition according to claim 9, wherein the phenolic antioxidant is in an amount of 0.003 to 1 part by weight per 100 parts by weight of the polybutylene terephthalate resin.

33. The composition according to claim 32, wherein the phenolic antioxidant is a hindered phenolic antioxidant having a molecular weight of 200 or greater.

34. The composition according to claim 32, wherein the phenolic antioxidant is a hindered phenolic antioxidant having a molecular weight of 500 or greater.

* * * * *